US012230857B2

(12) United States Patent
Benitez et al.

(10) Patent No.: US 12,230,857 B2
(45) Date of Patent: Feb. 18, 2025

(54) RADAR WAVEGUIDE AND CHOKE ASSEMBLY

(71) Applicant: NAVICO, INC., Tulsa, OK (US)

(72) Inventors: Ricardo Andres Perez Benitez, Auckland (NZ); Michael Cann, Auckland (NZ); Lindsay Lilburn, Auckland (NZ); Cameron Malcolm Arthur, Auckland (NZ)

(73) Assignee: Navico, Inc., Tulsa, OK (US)

( * ) Notice: Subject to any disclaimer, the term of this patent is extended or adjusted under 35 U.S.C. 154(b) by 573 days.

(21) Appl. No.: 17/537,781

(22) Filed: Nov. 30, 2021

(65) Prior Publication Data

US 2023/0170596 A1 Jun. 1, 2023

(51) Int. Cl.
*H01P 3/123* (2006.01)
*H01P 1/208* (2006.01)

(52) U.S. Cl.
CPC ............ *H01P 3/123* (2013.01); *H01P 1/2088* (2013.01)

(58) Field of Classification Search
CPC ........ H01P 3/123; H01P 1/2088; H01P 1/042; H01P 1/30
See application file for complete search history.

(56) References Cited

U.S. PATENT DOCUMENTS

| | | | |
|---|---|---|---|
| 5,781,087 A * | 7/1998 | Milroy .................... H01P 1/065 333/261 | |
| 6,404,455 B1 | 6/2002 | Ito et al. | |
| 7,019,686 B2 | 3/2006 | Hester et al. | |
| 7,043,280 B1 | 5/2006 | Shields et al. | |
| 7,366,553 B1 | 4/2008 | Shields et al. | |
| 7,460,060 B2 | 12/2008 | Aoki | |

(Continued)

FOREIGN PATENT DOCUMENTS

| | | |
|---|---|---|
| EP | 2821808 A1 | 1/2015 |
| EP | 2857858 A1 | 4/2015 |

(Continued)

OTHER PUBLICATIONS

"Waveguide Joints;" radartutorial.eu; retrieved Jan. 5, 2022 from https://www.radartutorial.eu/03.linetheory/tl13.en.html.

(Continued)

*Primary Examiner* — Andrea Lindgren Baltzell
*Assistant Examiner* — Kimberly E Glenn
(74) *Attorney, Agent, or Firm* — Nelson Mullins Riley & Scarborough LLP

(57) ABSTRACT

A radar device for limiting radio-frequency power leakage is provided. The radar device includes a first component, and a second component. The first component has a first surface and a first waveguide that defines a first cavity. The second component has a second surface and a second waveguide that defines a second cavity. A first groove is provided that acts as a choke, and the first groove is defined in the first surface. The first component and the second component are assembled so that an air gap is maintained between the first waveguide and the second waveguide. The first waveguide and the second waveguide are configured to facilitate transmission of radio-frequency power. The first groove is configured to reduce leakage of radio-frequency power through the air gap. Additional chokes may also be included.

20 Claims, 28 Drawing Sheets

(56) References Cited

U.S. PATENT DOCUMENTS

| | | | |
|---|---|---|---|
| 7,495,598 | B2 | 2/2009 | Holmberg |
| 7,646,329 | B2 | 1/2010 | Britton et al. |
| 7,688,257 | B1 | 3/2010 | Christianson et al. |
| 7,764,223 | B2 | 7/2010 | Wade |
| 8,193,974 | B2 | 6/2012 | Logan et al. |
| 8,665,135 | B2 | 3/2014 | Dai |
| 8,674,885 | B2 | 3/2014 | Leiba et al. |
| 9,182,482 | B2 | 11/2015 | Lilburn |
| 9,194,946 | B1 | 11/2015 | Vacanti |
| 9,203,691 | B2 | 12/2015 | Schwarz et al. |
| 9,213,089 | B2 | 12/2015 | Mowbray et al. |
| 9,310,479 | B2 | 4/2016 | Knight et al. |
| 9,497,884 | B2 | 11/2016 | Oda |
| 9,581,695 | B2 | 2/2017 | Corbett et al. |
| 9,618,605 | B2 | 4/2017 | Johnson et al. |
| 9,645,226 | B2 | 5/2017 | Scott et al. |
| 9,715,007 | B2 | 7/2017 | Lohoefener et al. |
| 9,739,873 | B2 | 8/2017 | Lilburn et al. |
| 9,774,076 | B2 | 9/2017 | Leiba |
| 9,829,576 | B2 | 11/2017 | Minowa et al. |
| 9,864,043 | B2 | 1/2018 | Franceschini et al. |
| 9,897,695 | B2 | 2/2018 | Vacanti |
| 9,972,917 | B2 | 5/2018 | Vacanti et al. |
| 10,001,548 | B2 | 6/2018 | Phillips et al. |
| 10,048,364 | B2 | 8/2018 | Shimizu |
| 10,114,116 | B2 | 10/2018 | Lilburn et al. |
| 10,114,118 | B2 | 10/2018 | Atsumi et al. |
| 10,120,069 | B2 | 11/2018 | Lilburn et al. |
| 10,215,842 | B2 | 2/2019 | Phillips et al. |
| 10,222,454 | B2 | 3/2019 | Lilburn et al. |
| 10,312,578 | B2 | 6/2019 | Nakahama |
| 10,347,980 | B2 | 7/2019 | Miyagawa |
| 10,379,202 | B2 | 8/2019 | Yamabayashi et al. |
| 10,436,887 | B2 | 10/2019 | Stokes et al. |
| 10,514,455 | B2 | 12/2019 | Fujioka |
| 10,522,893 | B2 | 12/2019 | Hobden |
| 10,651,541 | B1 | 5/2020 | Hayes et al. |
| 10,673,458 | B2 | 6/2020 | Tanaka et al. |
| 10,838,040 | B2 | 11/2020 | Jales et al. |
| 10,938,153 | B2 | 3/2021 | Mahon et al. |
| 2013/0169468 | A1 | 7/2013 | Johnson et al. |
| 2015/0268328 | A1 | 9/2015 | Johnson et al. |
| 2016/0197399 | A1 | 7/2016 | Davy et al. |
| 2018/0149731 | A1 | 5/2018 | Goto et al. |
| 2018/0275247 | A1 | 9/2018 | Tanaka |
| 2018/0316086 | A1 | 11/2018 | Lehman et al. |
| 2019/0324118 | A1 | 10/2019 | Storz |
| 2019/0334249 | A1 | 10/2019 | Smith et al. |
| 2019/0391257 | A1 | 12/2019 | Nakahama |
| 2020/0136225 | A1 | 4/2020 | Shi |
| 2020/0166637 | A1 | 5/2020 | Hess et al. |
| 2020/0335861 | A1 | 10/2020 | Lehman et al. |
| 2020/0335862 | A1 | 10/2020 | Lehman et al. |
| 2020/0335863 | A1 | 10/2020 | Lehman et al. |
| 2020/0373682 | A1 | 11/2020 | Root et al. |

FOREIGN PATENT DOCUMENTS

| | | | |
|---|---|---|---|
| EP | 3017500 | A1 | 5/2016 |
| EP | 3438694 | A1 | 2/2019 |
| EP | 2857857 | B1 | 8/2019 |
| EP | 3616257 | A1 | 3/2020 |
| EP | 3647807 | A1 | 5/2020 |
| EP | 2736115 | B1 | 10/2020 |
| EP | 3791441 | A1 | 3/2021 |
| JP | 4529876 | B2 | 8/2010 |
| JP | 5607424 | B2 | 10/2014 |
| JP | 5650420 | B2 | 1/2015 |
| JP | 6008640 | B2 | 10/2016 |
| JP | 6043083 | B2 | 12/2016 |
| JP | 6059892 | B2 | 1/2017 |
| JP | 6084813 | B2 | 2/2017 |
| JP | 6095899 | B2 | 3/2017 |
| JP | 6124438 | B2 | 5/2017 |
| JP | 2017-110993 | A | 6/2017 |
| JP | 6255153 | B2 | 12/2017 |
| JP | 6370121 | B2 | 8/2018 |
| JP | 6532716 | B2 | 6/2019 |
| JP | 2020-521344 | A | 7/2020 |
| WO | WO 2014/042134 | A1 | 3/2014 |
| WO | WO 2016/072208 | A1 | 5/2016 |
| WO | WO 2017/083597 | A1 | 5/2017 |
| WO | WO 2019/119230 | A1 | 6/2019 |
| WO | WO 2019/168484 | A2 | 9/2019 |
| WO | WO 2019/209461 | A1 | 10/2019 |
| WO | WO 2019/215004 | A1 | 11/2019 |
| WO | WO 2020/200882 | A1 | 10/2020 |

OTHER PUBLICATIONS

"Waveguide Flange;" *Wikipedia*; retrieved Jan. 5, 2022 from https://en.wikipedia.org/wiki/Waveguide_flange.

* cited by examiner

RADAR WAVEGUIDE AND CHOKE ASSEMBLY

FIELD OF THE INVENTION

Embodiments of the present invention relate generally to radar devices having waveguide assemblies.

BACKGROUND OF THE INVENTION

In existing systems, radio-frequency power is transmitted in waveguides to and from a rotating antenna array. The waveguides are typically sealed in some manner to prevent leakage of radio-frequency power. However, the approaches that have been utilized are limited in several respects.

Conductive gaskets have been utilized to reduce leakage occurring within radar devices and waveguide assemblies within radar devices. These conductive gaskets often include an elastomer, a knitted wire, or a combination of the two. The gasket electrically connects the two waveguides. Because the conductive gaskets seal and connect the two surfaces with the waveguides, the conductive gaskets possess issues with heat dissipation. Additionally, the conductive gasket approach presents assembly and maintenance challenges. In a marine environment, stress often acts on the conductive gasket, which may cause its performance to decline over time. Also, the conductive gaskets utilize reflective signals, and these reflective signals often disturb signal integrity, reducing the performance of the radar device. Additionally, radio-frequency (RF) breakdown may occur where contact surfaces are not smooth, and vibration may cause the conductive gasket to shift over time to cause a reduced performance of the radar device.

Microwave absorbers are also utilized to control RF power transmission. This provides a material designed to absorb electromagnetic energy at a specific frequency range. The microwave absorber often includes a foam with carbon filler, and this microwave absorber may be positioned on the periphery between the two waveguides, such as with adhesive. This microwave absorber approach dissipates heat poorly, and this microwave absorber approach also has the disadvantage that the adhesive tends to fall off over time. Additionally, reflective signals often disturb signal integrity, reducing the performance of the radar device.

BRIEF SUMMARY OF THE INVENTION

In various embodiments described herein, a radar device is provided with improved heat dissipation, improved maintenance capabilities, and limited radio-frequency power leakage. While previous systems and devices attempted to eliminate any air gap to avoid radio-frequency power leakage, various embodiment systems, radar devices, and waveguide assemblies discussed herein provide such an air gap to provide improved heat dissipation so that heat generated at a waveguide assembly may be dissipated externally and to provide for ease of maintenance as parts of the radar device may be temporarily laterally displaced (e.g., along the air gap) to enable maintenance. Additionally, the air gap may dissipate heat within the first component of a waveguide assembly separately from heat within the second component, preventing overheating at one location. To limit the amount of radio-frequency power leakage, one or more grooves may be provided in the waveguide assemblies, and these grooves may each serve as a choke. To the extent radio-frequency power being transmitted starts to move into the air gap and away from the cavities formed by the waveguides, the grooves may assist in reducing leakage of radio-frequency power through the air gap and into the surrounding environment.

Various embodiments described herein are easier to manufacture and assemble, making manufacturing and assembly more cost-effective. By including an air gap in the waveguide assembly, the waveguide assembly and the radar device may accommodate greater mechanical tolerances in three axes, and this may further reduce the manufacturing and assembly costs. Further, maintenance is easier to perform because parts of the radar device can be removed without having to detach the two components of the waveguide system (as they are already separated by the air gap).

In an example embodiment, a system is provided for limiting radio-frequency power leakage. The system includes a first component having a first surface and a first waveguide that defines a first cavity and a second component having a second surface and a second waveguide that defines a second cavity. The system also includes a first groove that is configured to act as a choke. The first component and the second component are assembled so that an air gap is maintained between the first waveguide and the second waveguide. The first waveguide and the second waveguide are configured to facilitate transmission of radio-frequency power, and the first groove is configured to reduce leakage of radio-frequency power through the air gap. The first groove is defined in the first surface or the second surface.

In some embodiments, the system may also include a second groove, and the second groove may be defined in one of the first surface or the second surface. In some embodiments, the system may also include a housing, and the first component and the second component may be disposed in the housing. The first cavity and the second cavity may be aligned along an axis in some embodiments. In some embodiments, the first component may be configured to move relative to the second component. The first groove may have a width that is between 0.057 of a guide wavelength and 0.061 of a guide wavelength.

In some embodiments, the thickness of the air gap may be greater than zero. In some related embodiments, the air gap may have a maximum thickness that is 0.034 of a guide wavelength.

In some embodiments, the total transmission coefficient ($S_{21\_TOTAL}$) may be −30 decibels or more negative. In some related embodiments, the total transmission coefficient ($S_{21\_TOTAL}$) may be −50 decibels or more negative. The total transmission coefficient ($S_{21\_TOTAL}$) may be −50 decibels or more negative at an operating frequency of 9.5 gigahertz or lower, and the total transmission coefficient ($S_{21\_TOTAL}$) may be determined by obtaining a partial transmission coefficient ($S_{21\_PARTIAL}$) using a Vector Network Analyzer and by calculating the total transmission coefficient ($S_{21\_TOTAL}$) using the partial transmission coefficient ($S_{21\_PARTIAL}$).

In some embodiments, the first groove may define an inner diameter that is between 0.606 of a guide wavelength and 0.611 of a guide wavelength. In some related embodiments, the system may also include a second groove, the second groove may be defined in one of the first surface or the second surface, and the second groove may define an inside diameter that is between 1.019 of a guide wavelength and 1.024 of a guide wavelength.

In some embodiments, the first groove is configured to reduce leakage of radio-frequency power through the air gap by (i) redirecting radio-frequency power from the first groove back towards the first waveguide and the second waveguide; or (ii) combining electromagnetic waves of the radio-frequency power destructively in the first groove.

In another example embodiment, a radar device for limiting radio-frequency power leakage is provided. The radar device includes a first component having a first surface and a first waveguide that defines a first cavity. The radar device also includes a second component having a second surface and a second waveguide that defines a second cavity. The radar device also includes a first groove that is configured to act as a choke. The first component and the second component may be assembled so that an air gap is maintained between the first waveguide and the second waveguide. The first waveguide and the second waveguide may be configured to facilitate transmission of radio-frequency power, and the first groove may be configured to reduce leakage of radio-frequency power through the air gap. The first groove may be defined in the first surface or the second surface.

In some embodiments, the first surface and the second surface may be configured to form the air gap extending between the first surface and the second surface. The air gap may, in some embodiments, be configured to enhance heat dissipation by isolating the first component from the second component to enable separate heat dissipation from each of the first component and the second component to one or more external walls. In some embodiments, the radar device may also include a second groove that is defined in the first surface or the second surface. The radar device may also include an antenna in some embodiments, and the antenna may be configured to rotate relative to the second component of the radar device.

In another example embodiment, a waveguide assembly for limiting radio-frequency power leakage and increasing heat dissipation is provided. The waveguide assembly includes a first component having a first surface and a first waveguide that defines a first cavity. The waveguide assembly also includes a second component having a second surface and a second waveguide that defines a second cavity. The waveguide assembly also includes a first groove that is configured to act as a choke. The first component and the second component are assembled so that an air gap is maintained between the first waveguide and the second waveguide. The first waveguide and the second waveguide are configured to facilitate transmission of radio-frequency power, and the first groove is configured to reduce leakage of radio-frequency power through the air gap. The first groove is defined in the first surface or the second surface.

BRIEF DESCRIPTION OF THE DRAWINGS

Figure 1:
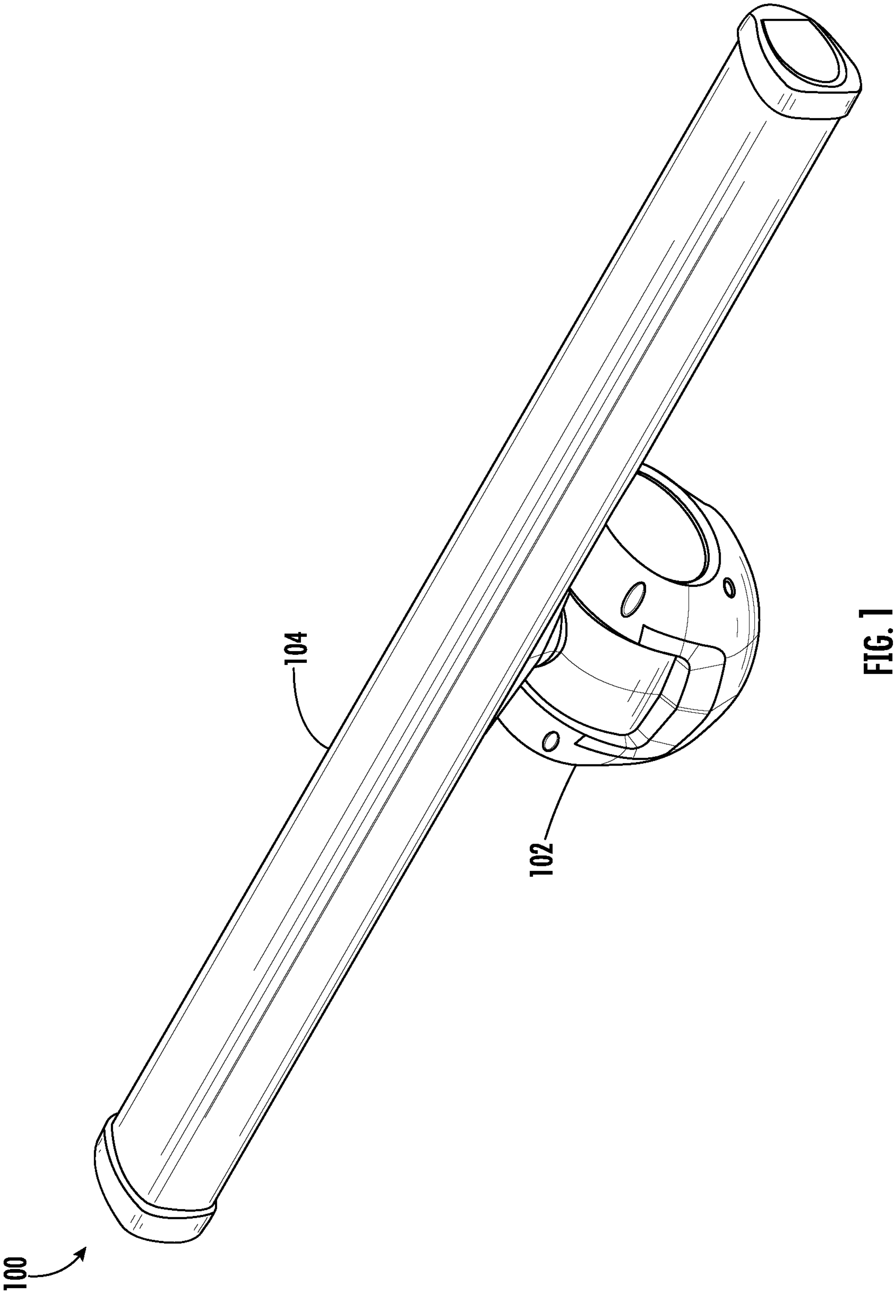
Figure 2A:
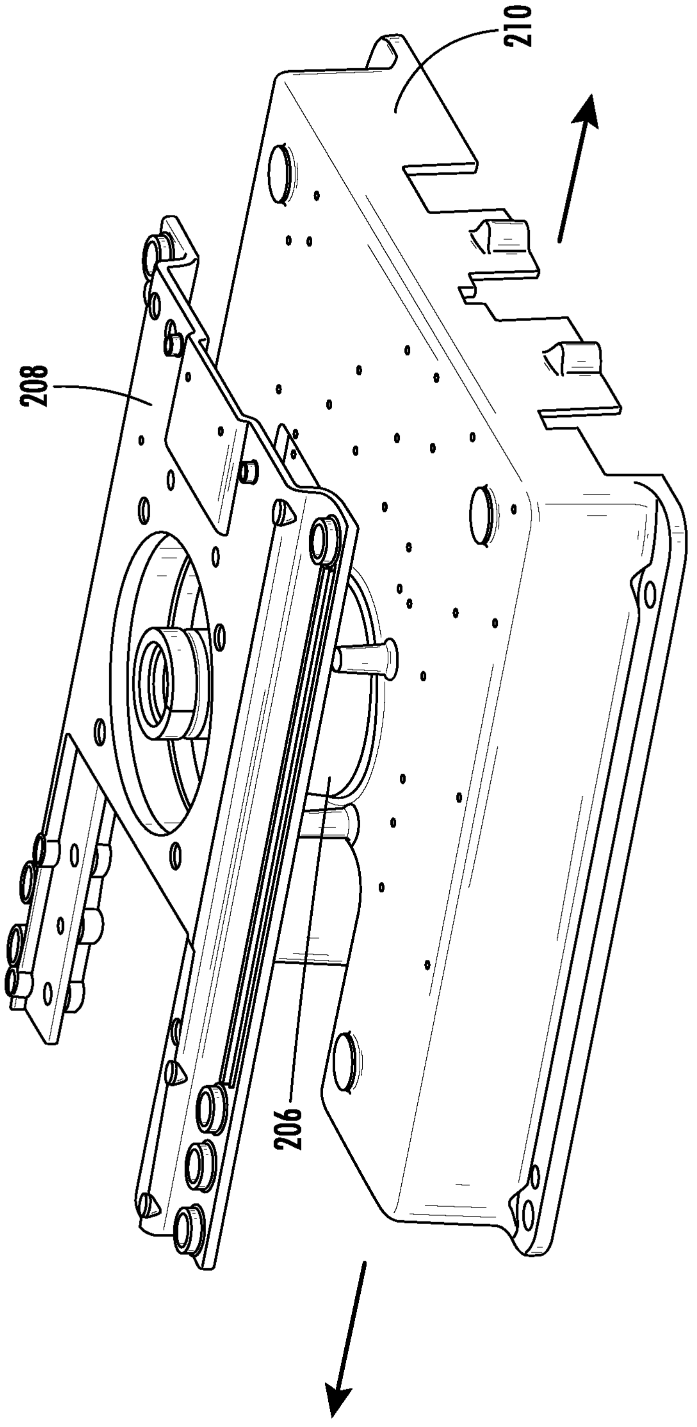
Figure 2B:
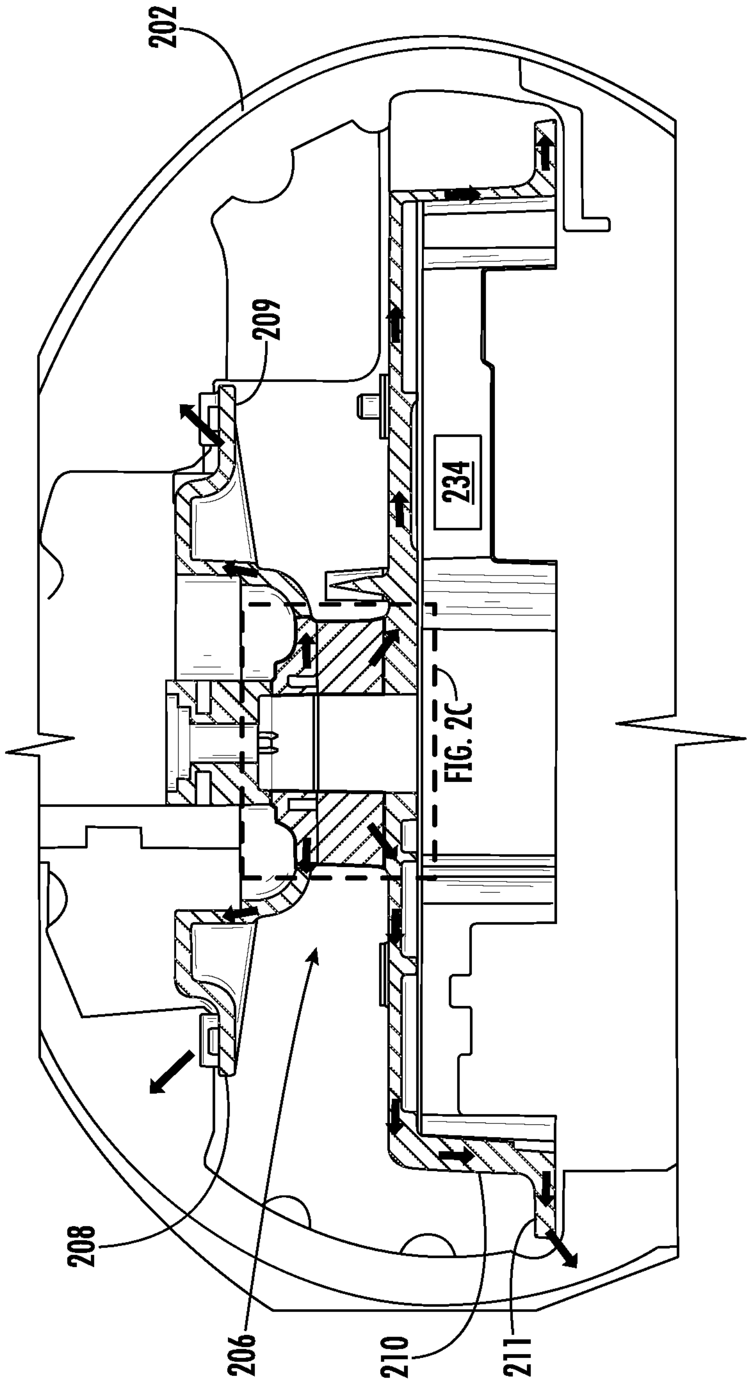
Figure 2C:
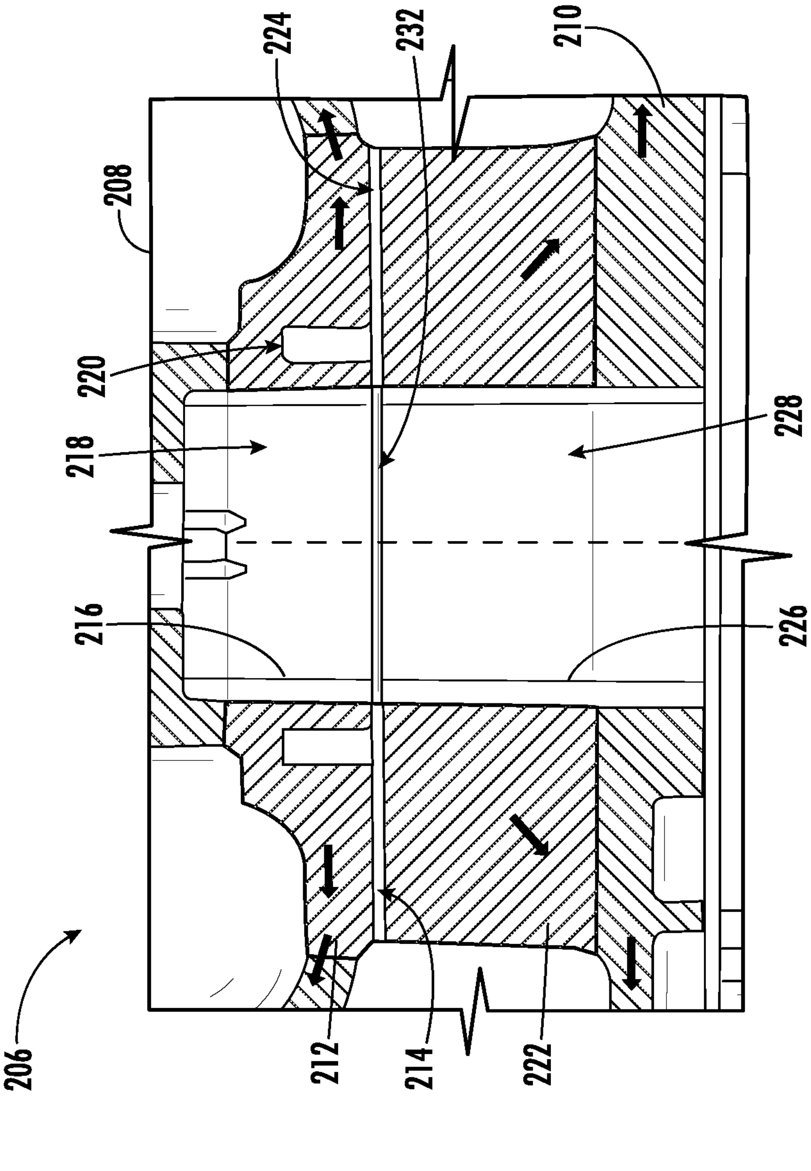
Figure 2D:
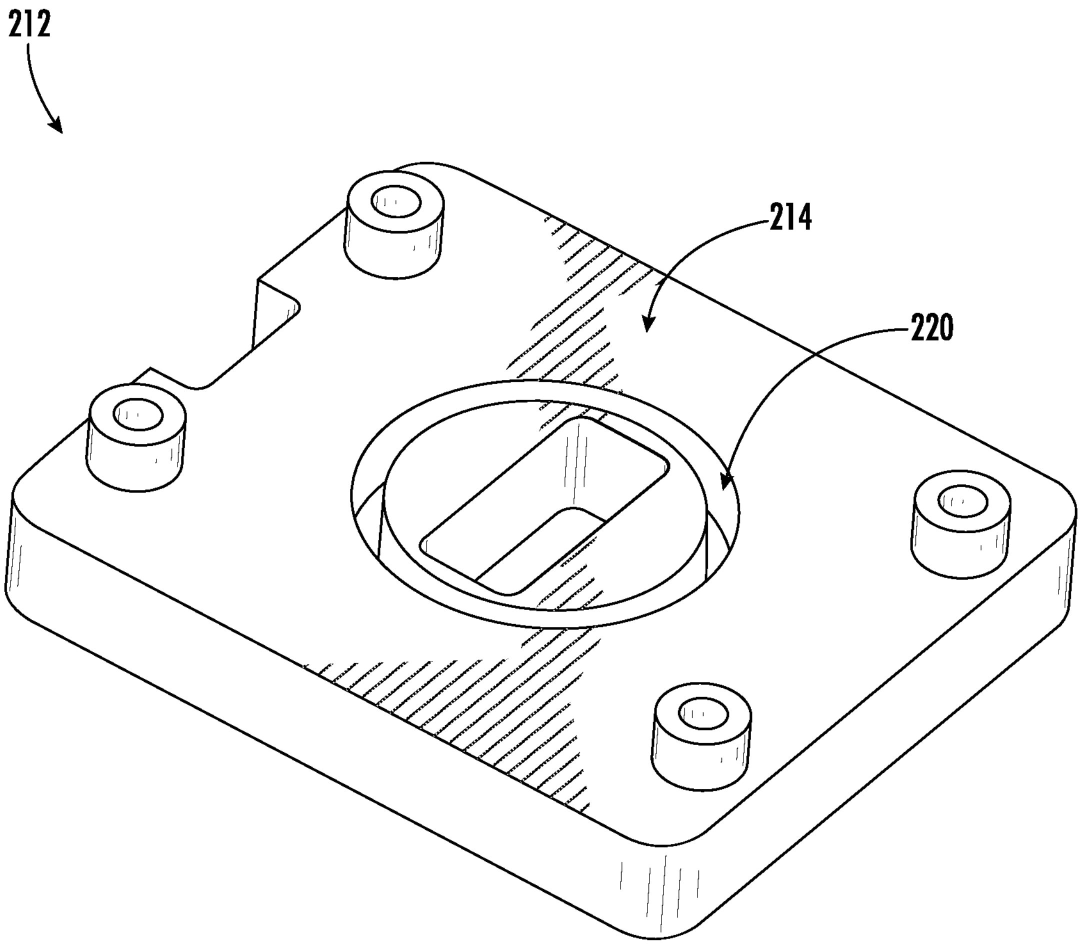
Figure 2E:
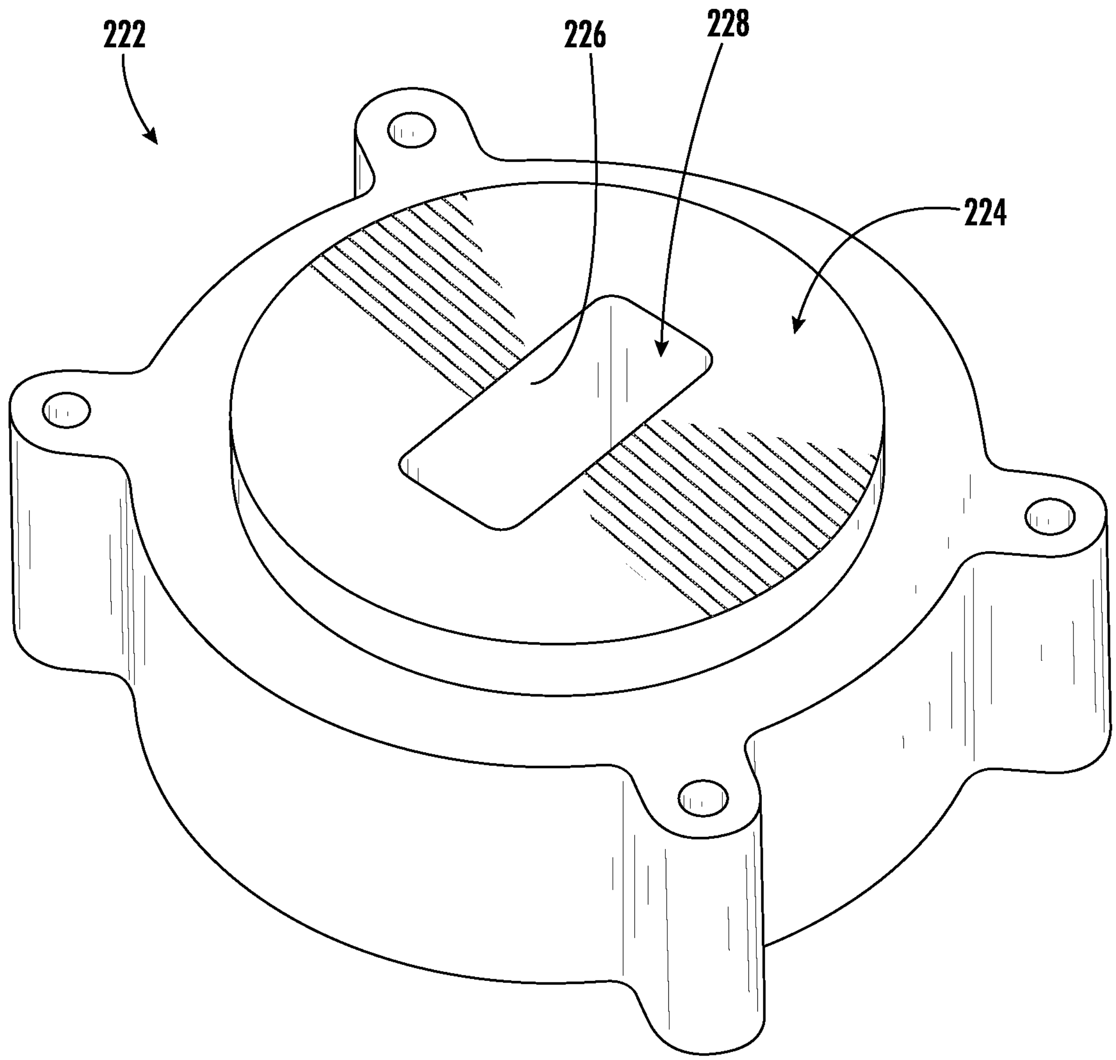
Figure 2F:
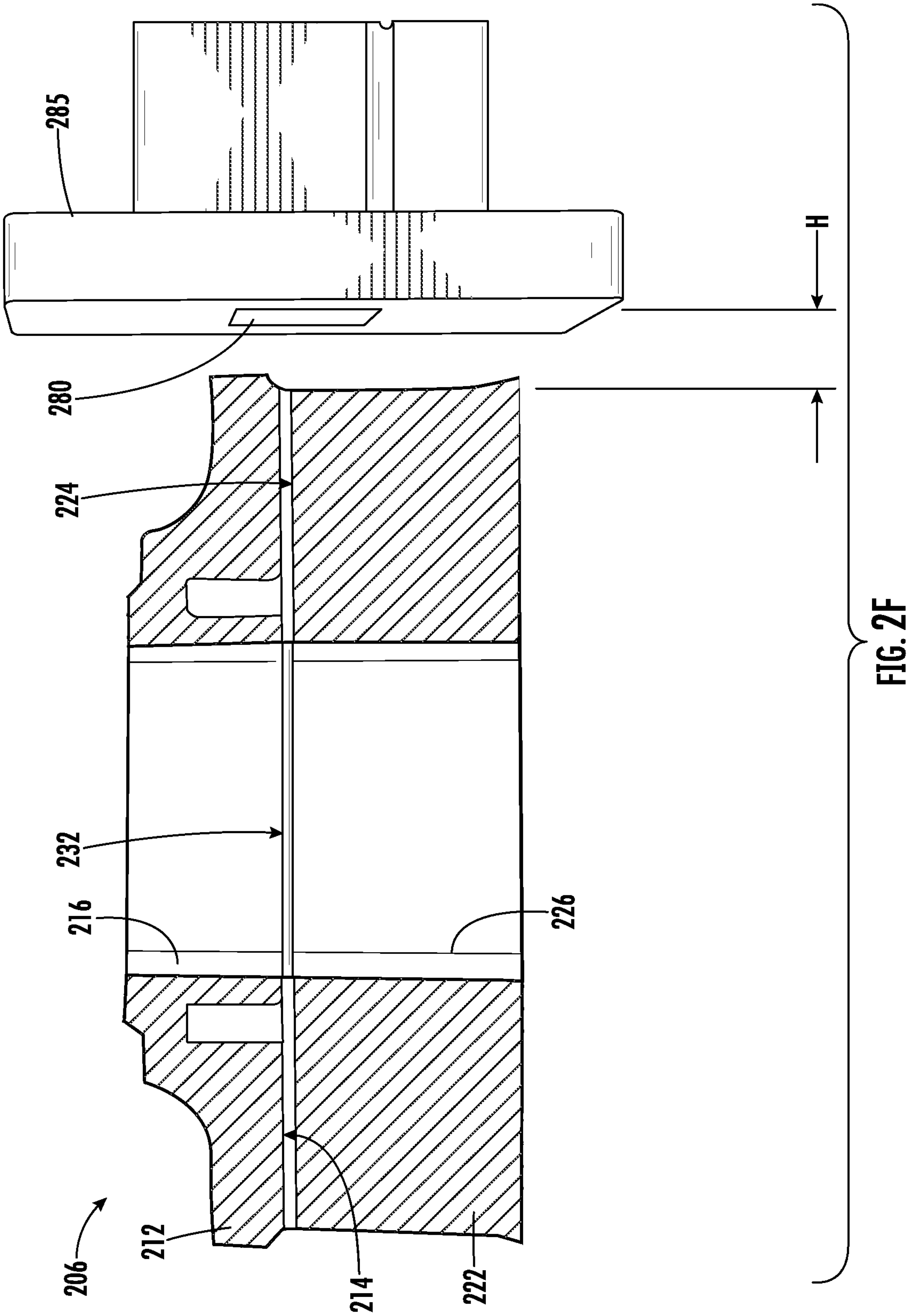
Figure 2G:
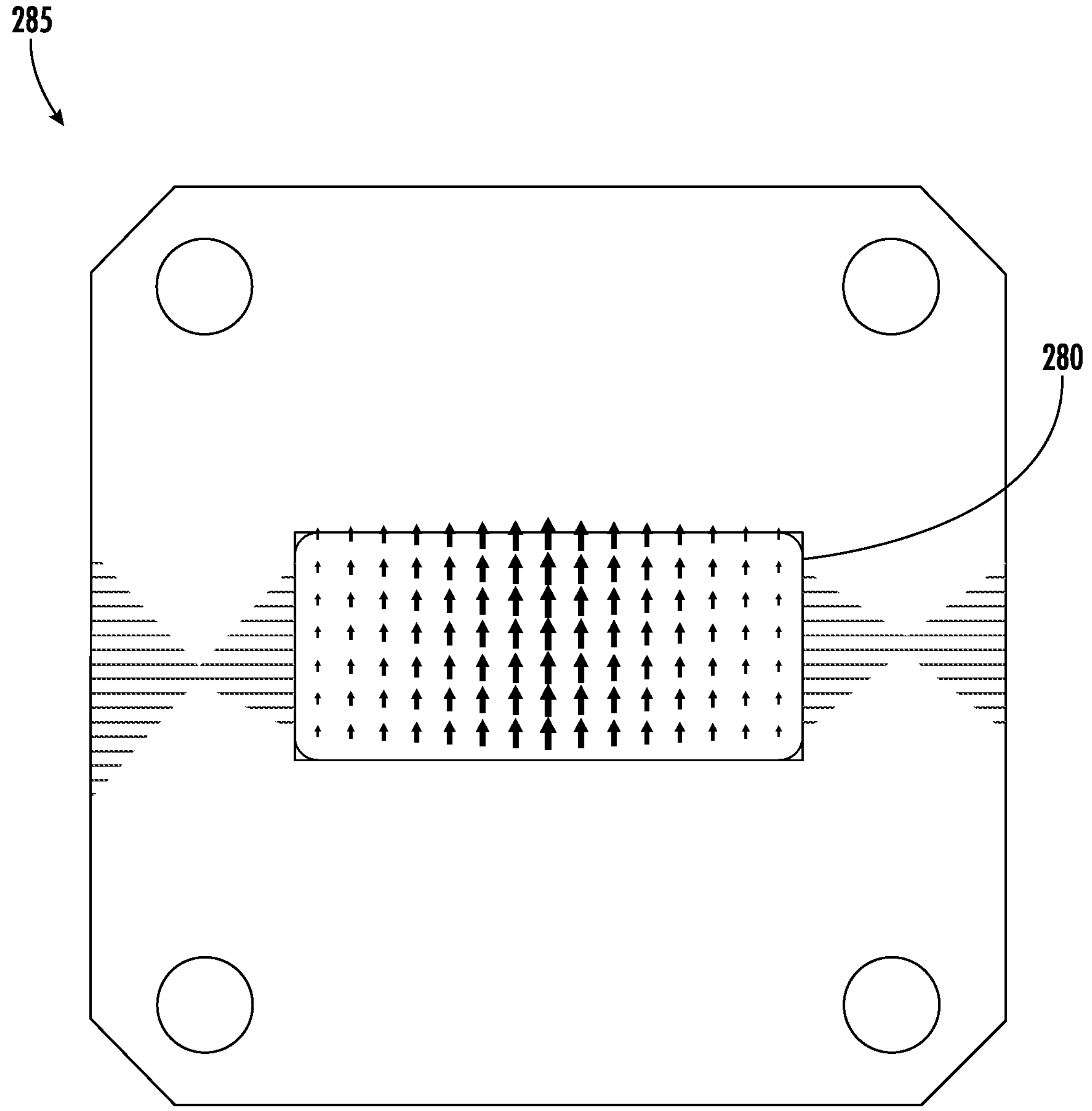
Figure 3A:
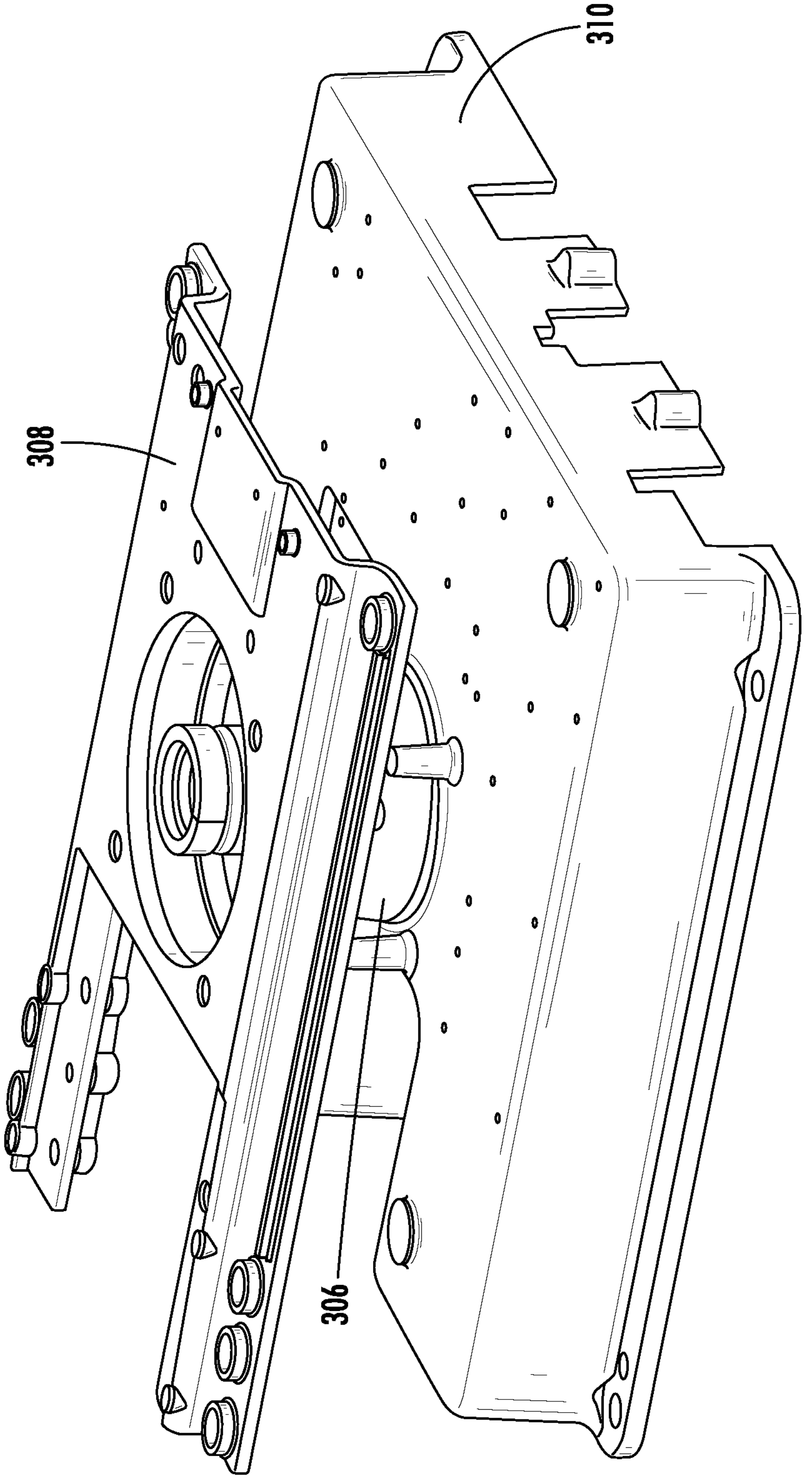
Figure 3B:
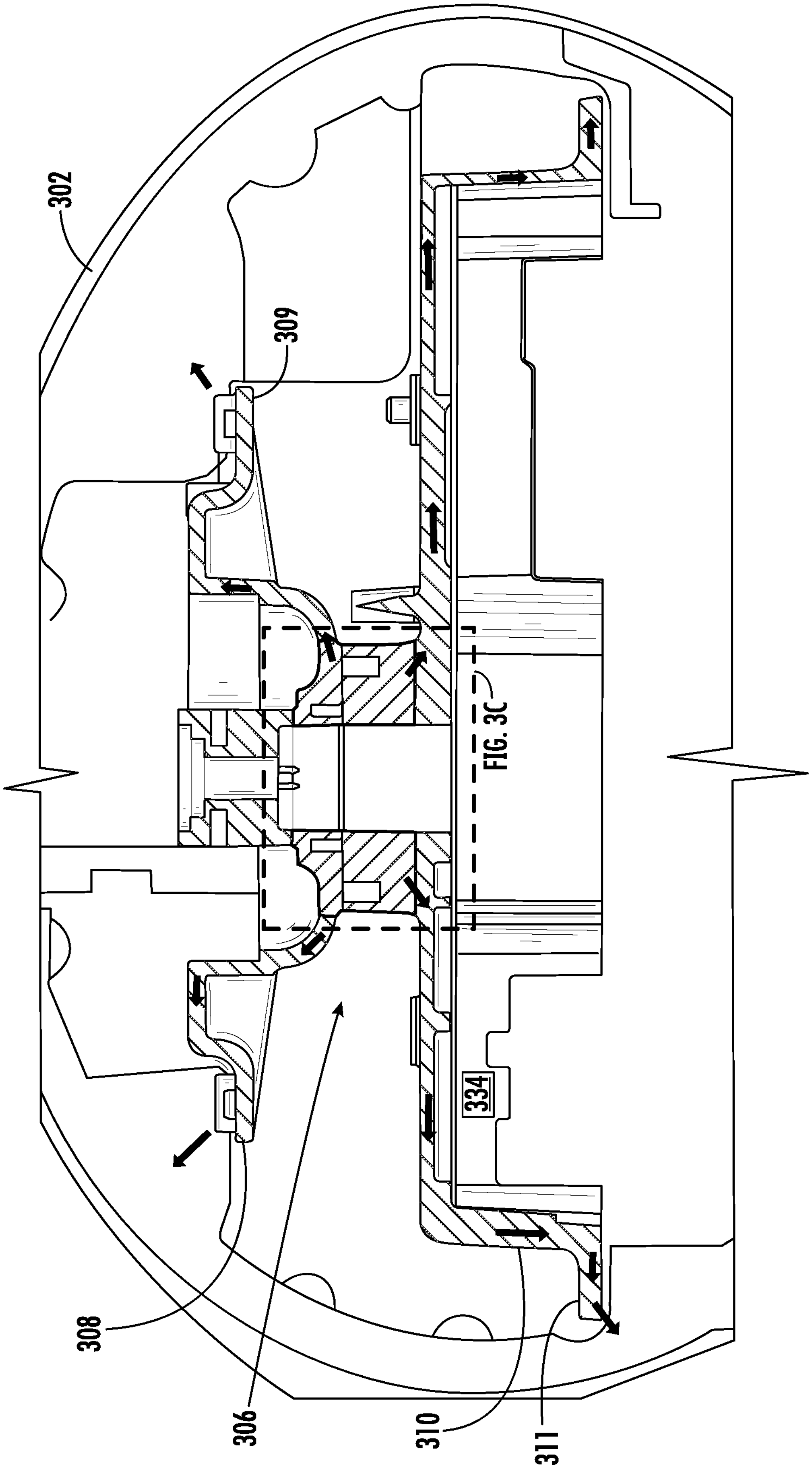
Figure 3C:
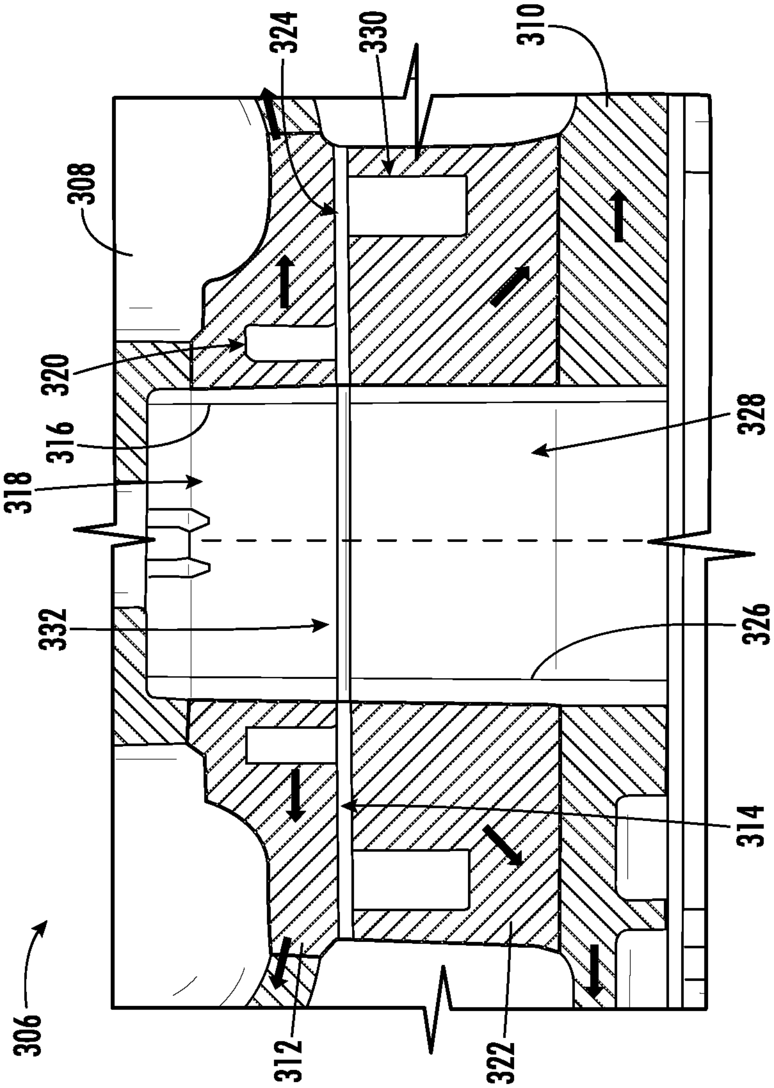
Figure 3D:
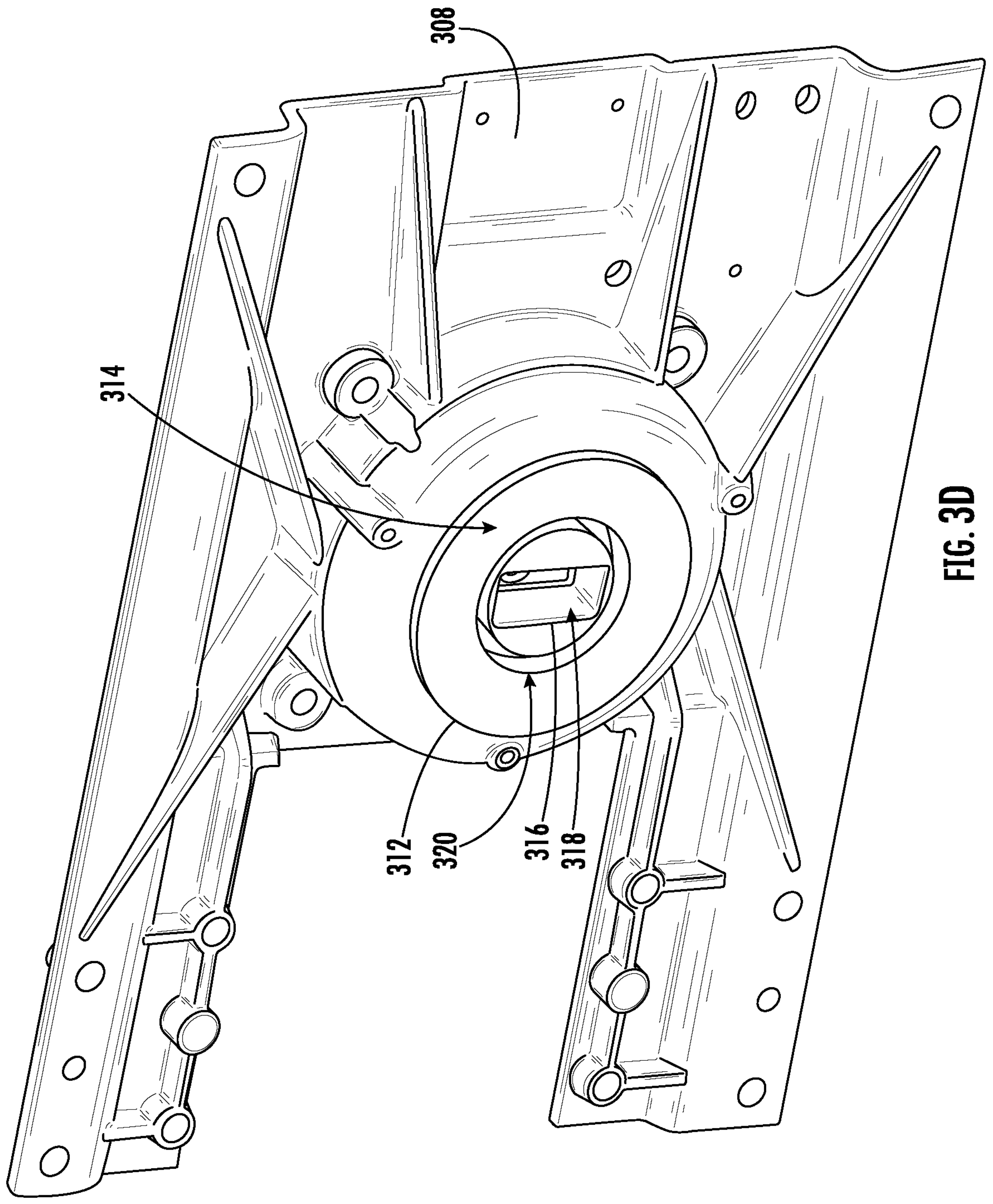
Figure 3E:
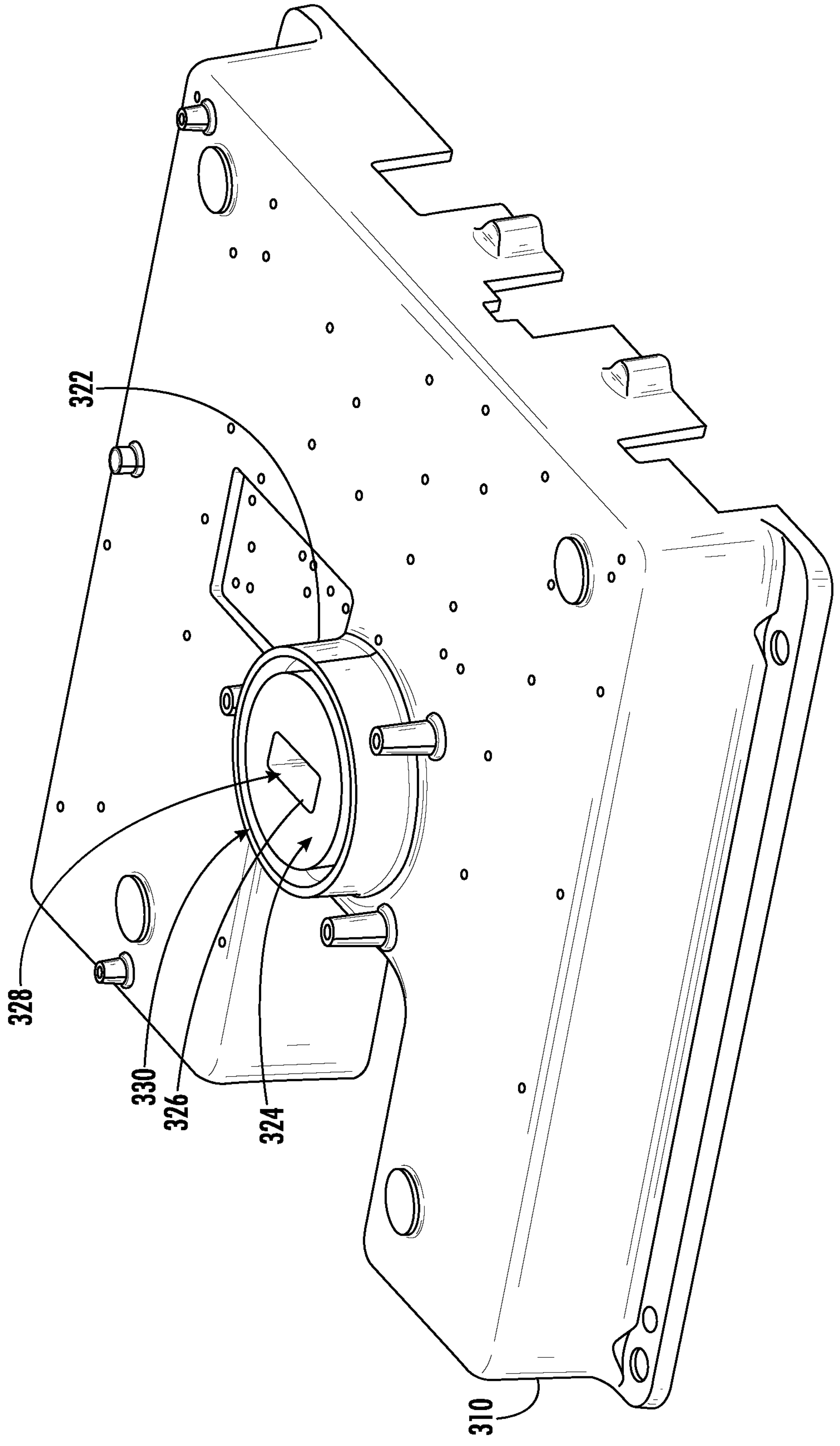
Figure 3F:
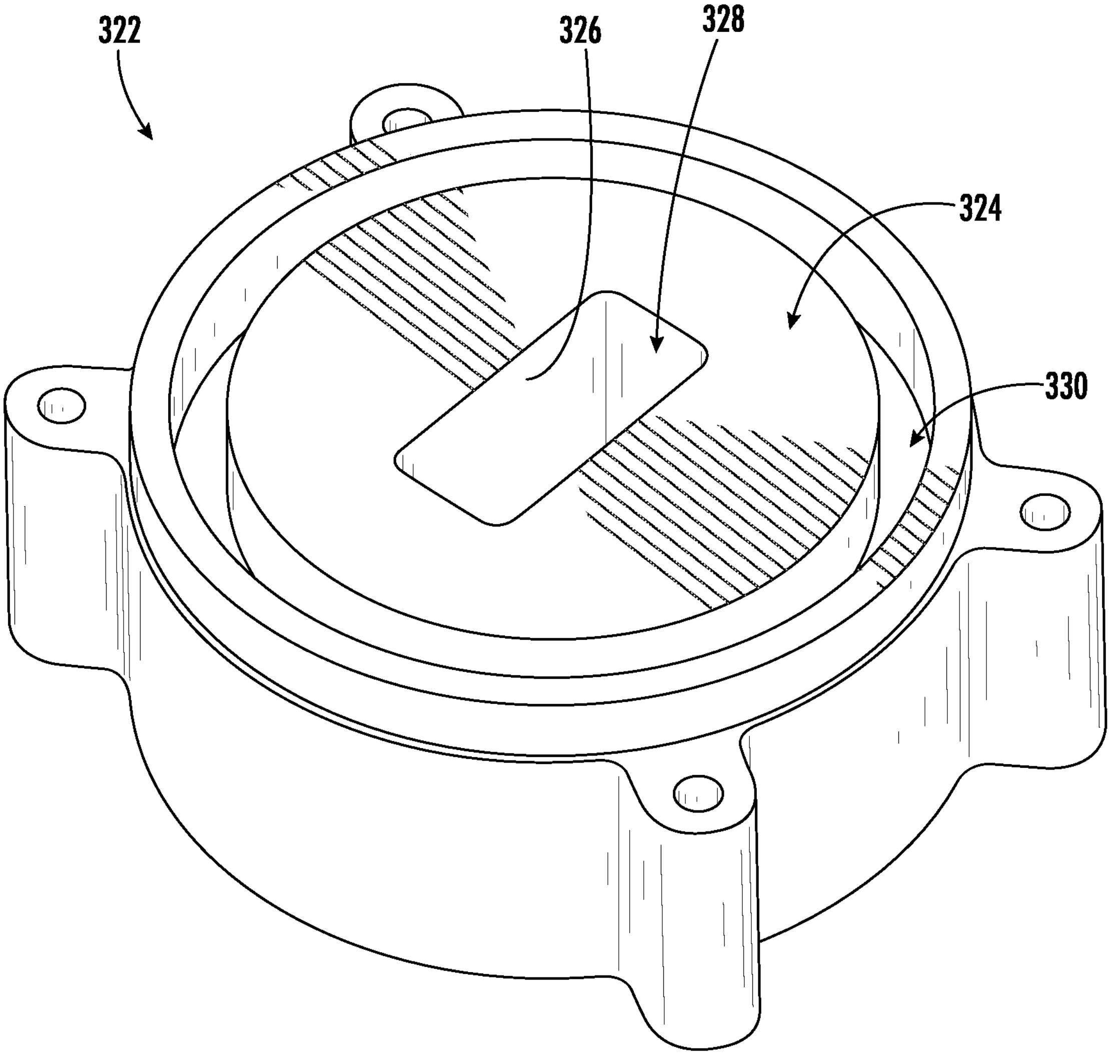
Figure 4A:
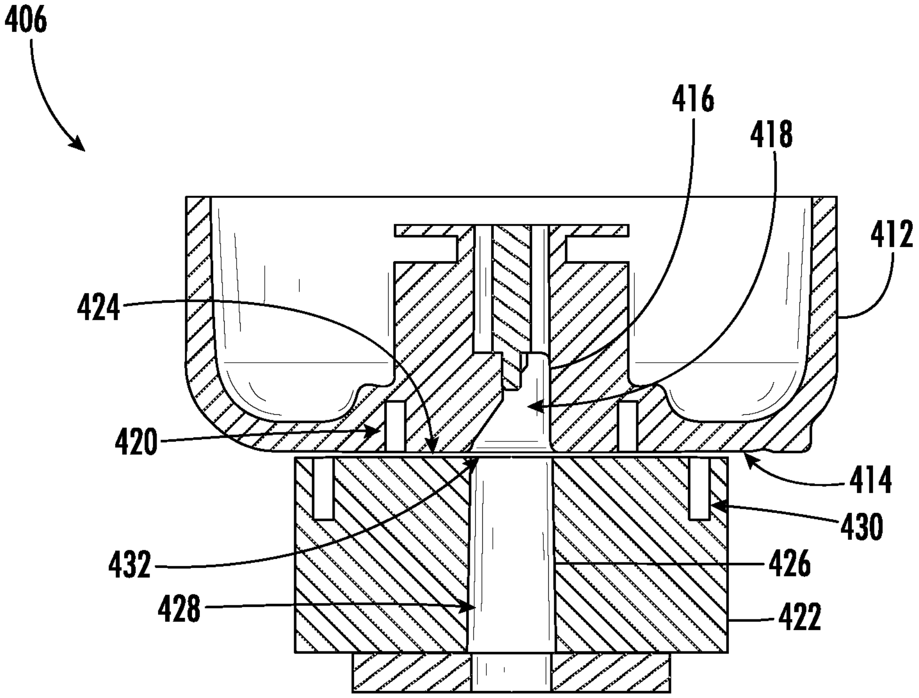
Figure 4B:
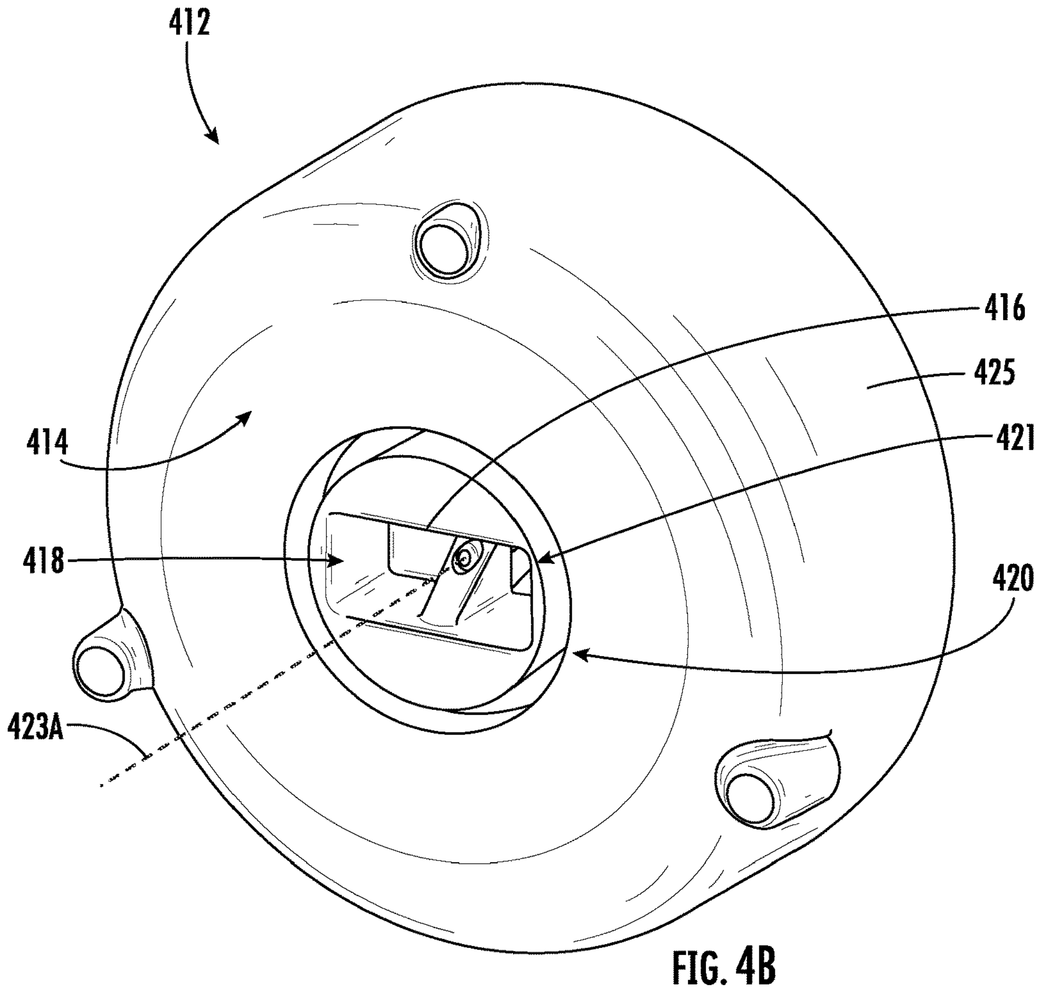
Figure 4C:
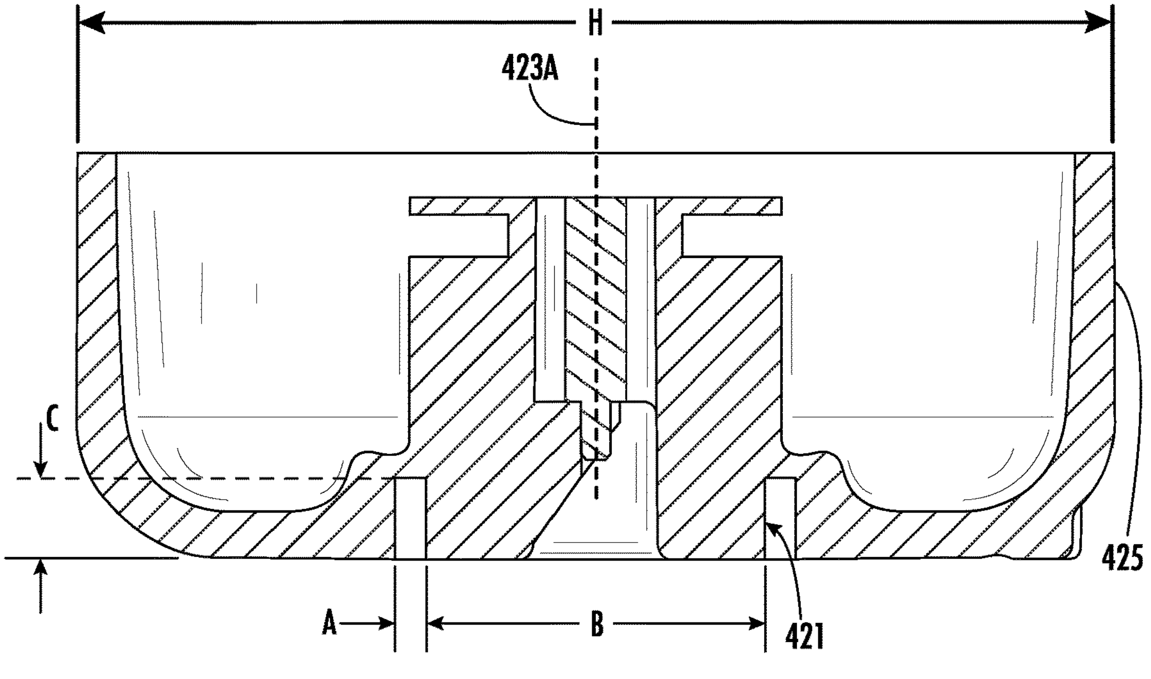
Figure 4D:
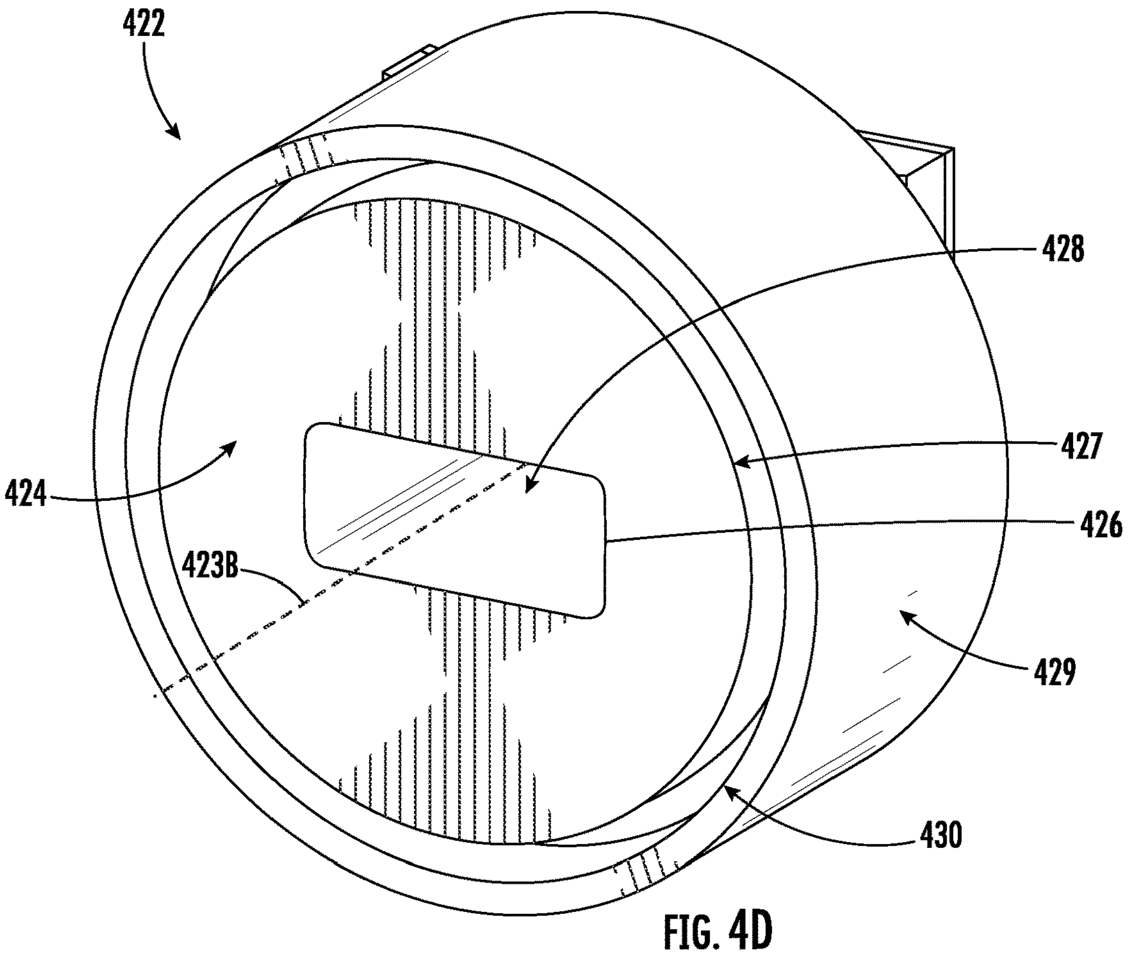
Figure 4E:
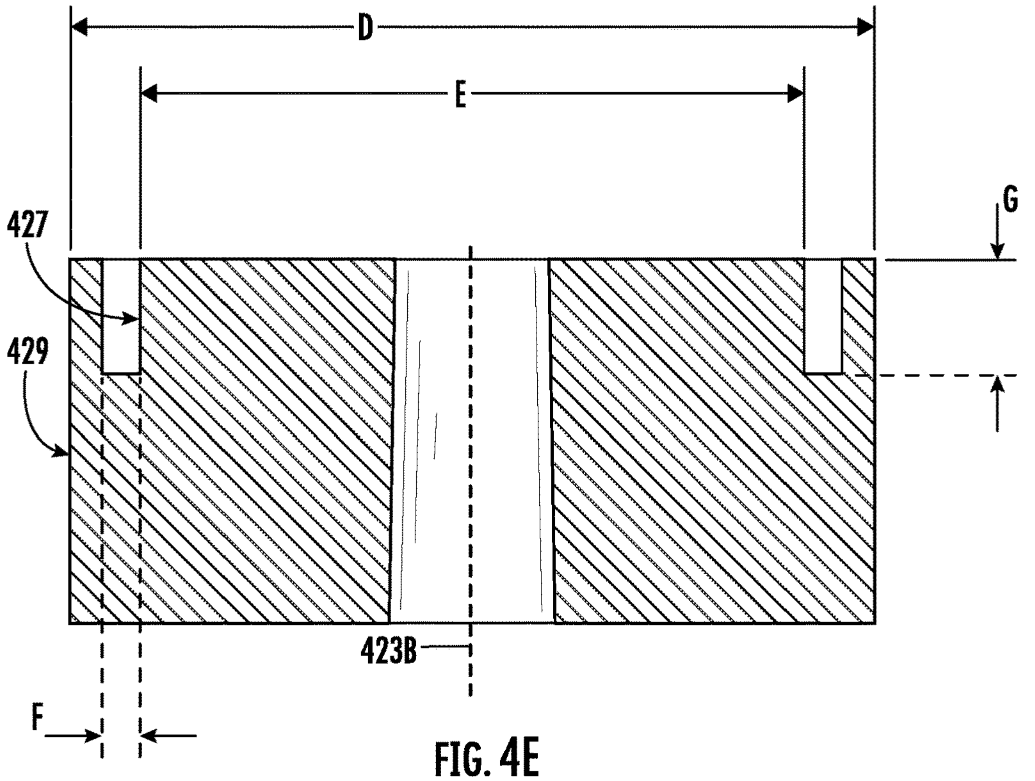
Figure 5A:
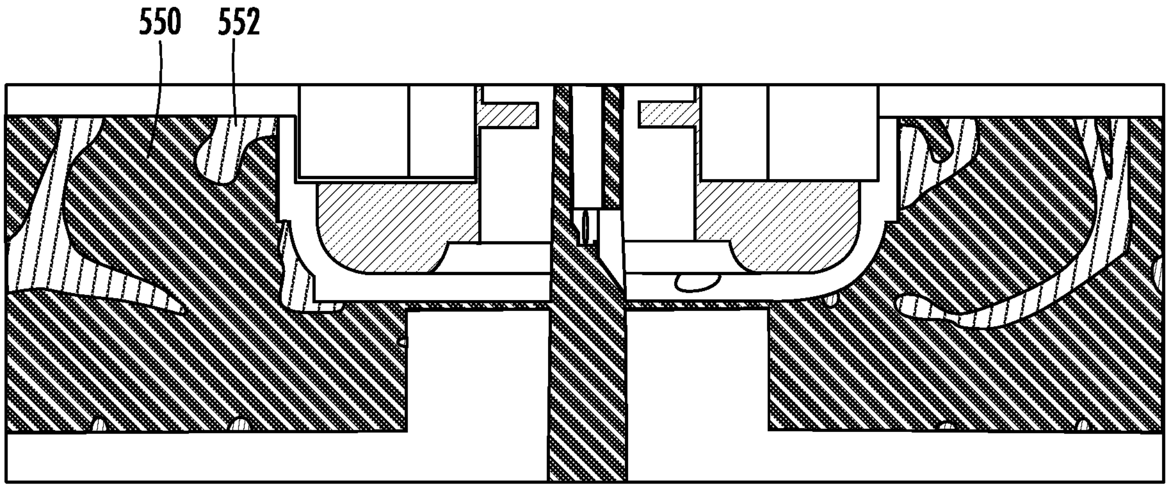
Figure 5B:
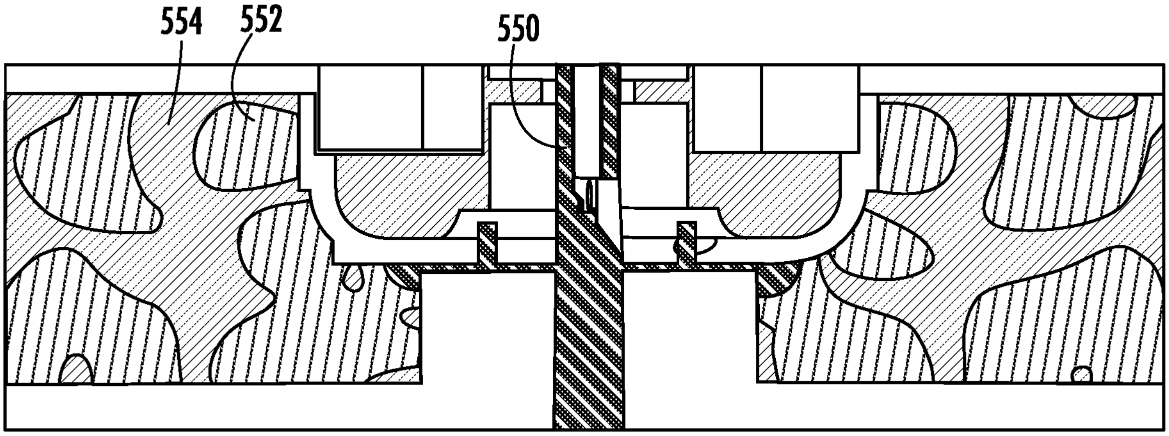
Figure 5C:
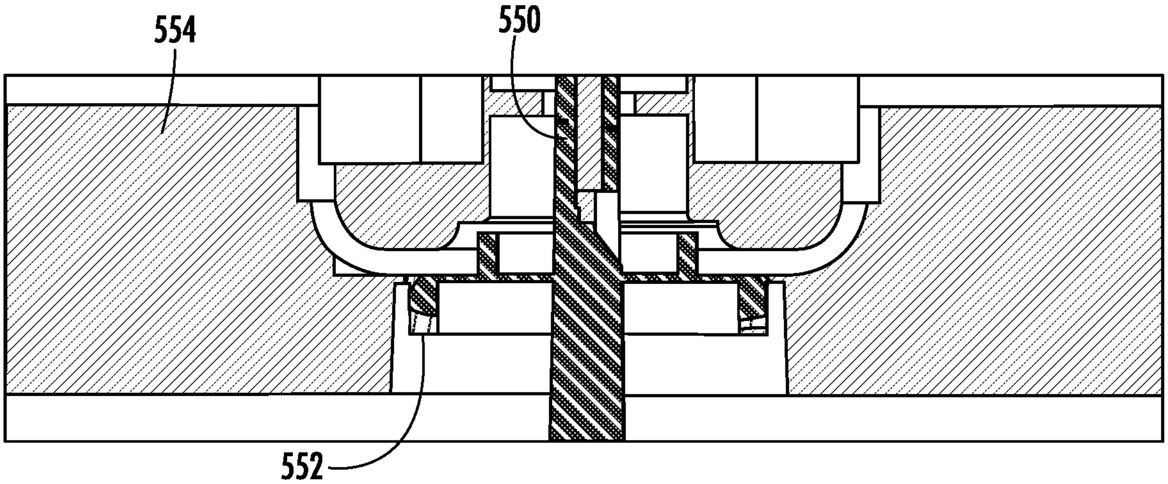
Figure 6A:
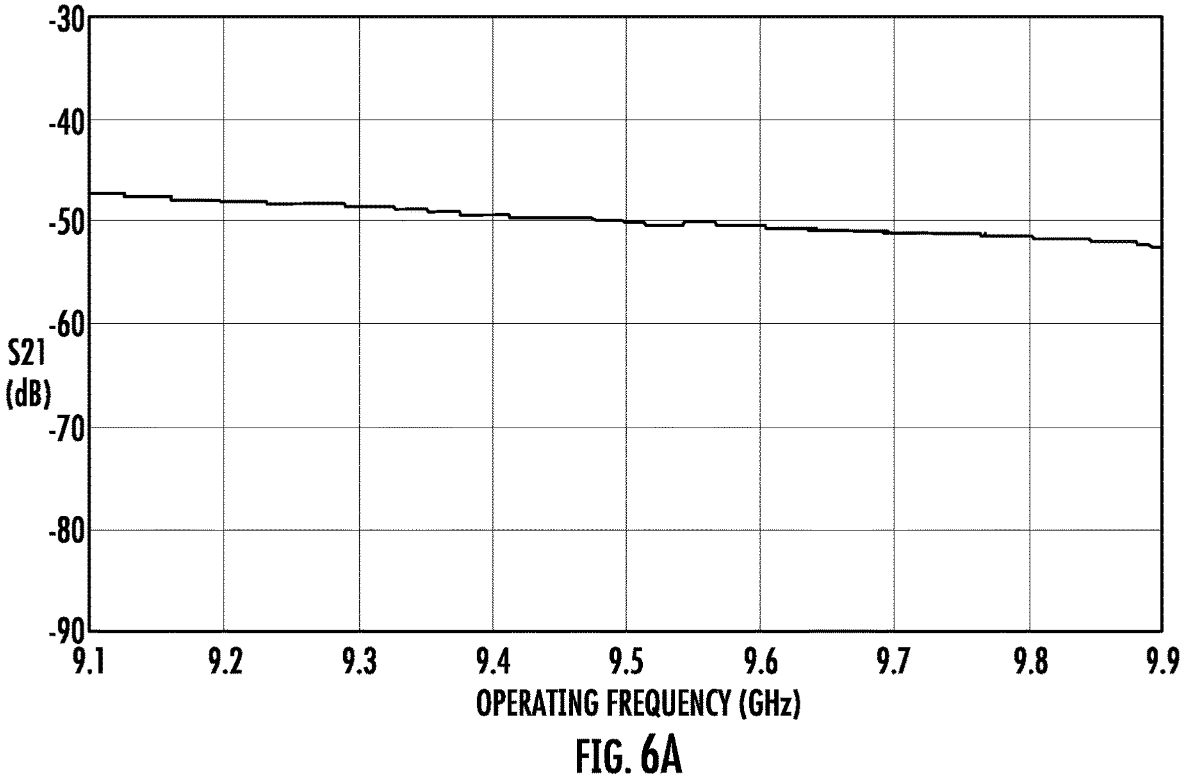
Figure 6B:
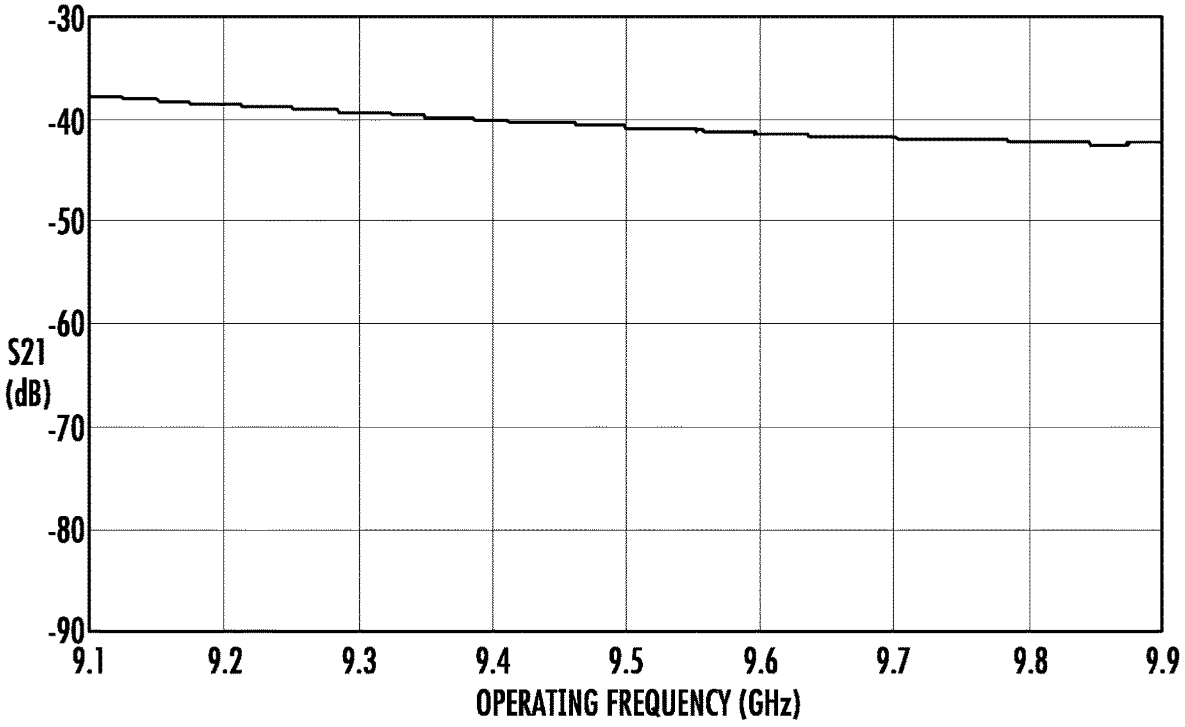
Figure 7A:
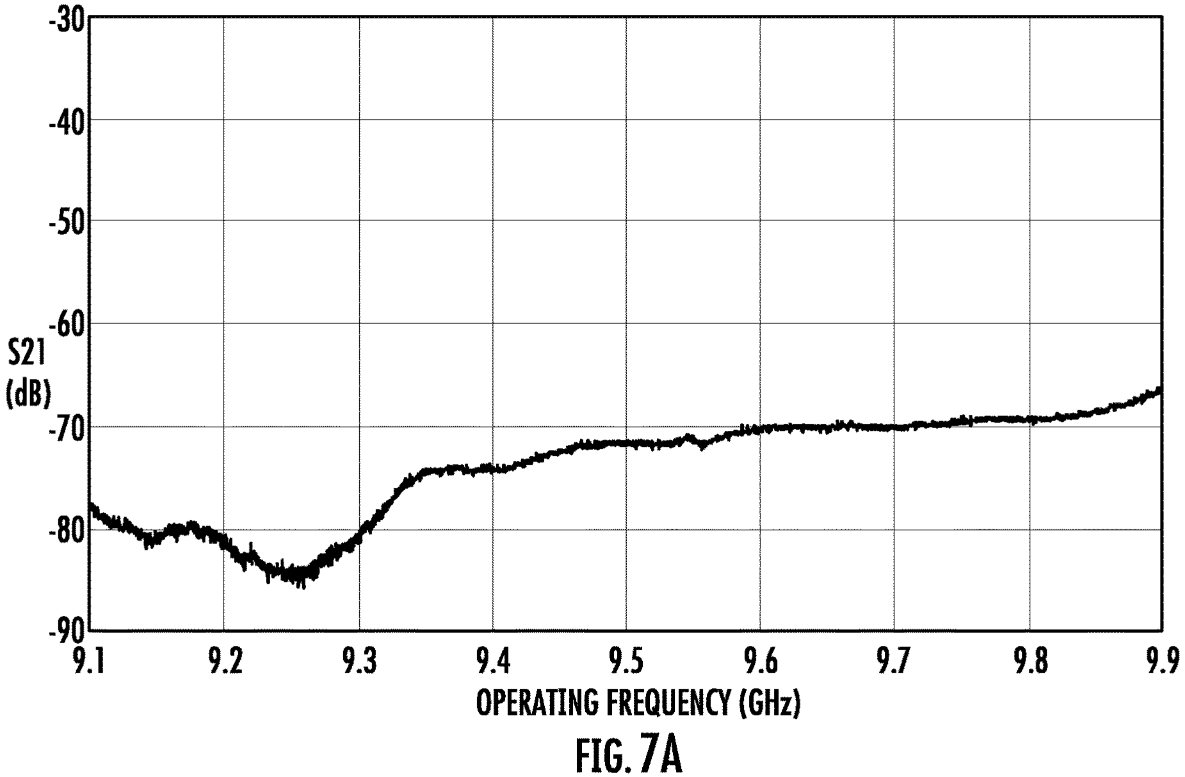
Figure 7B:
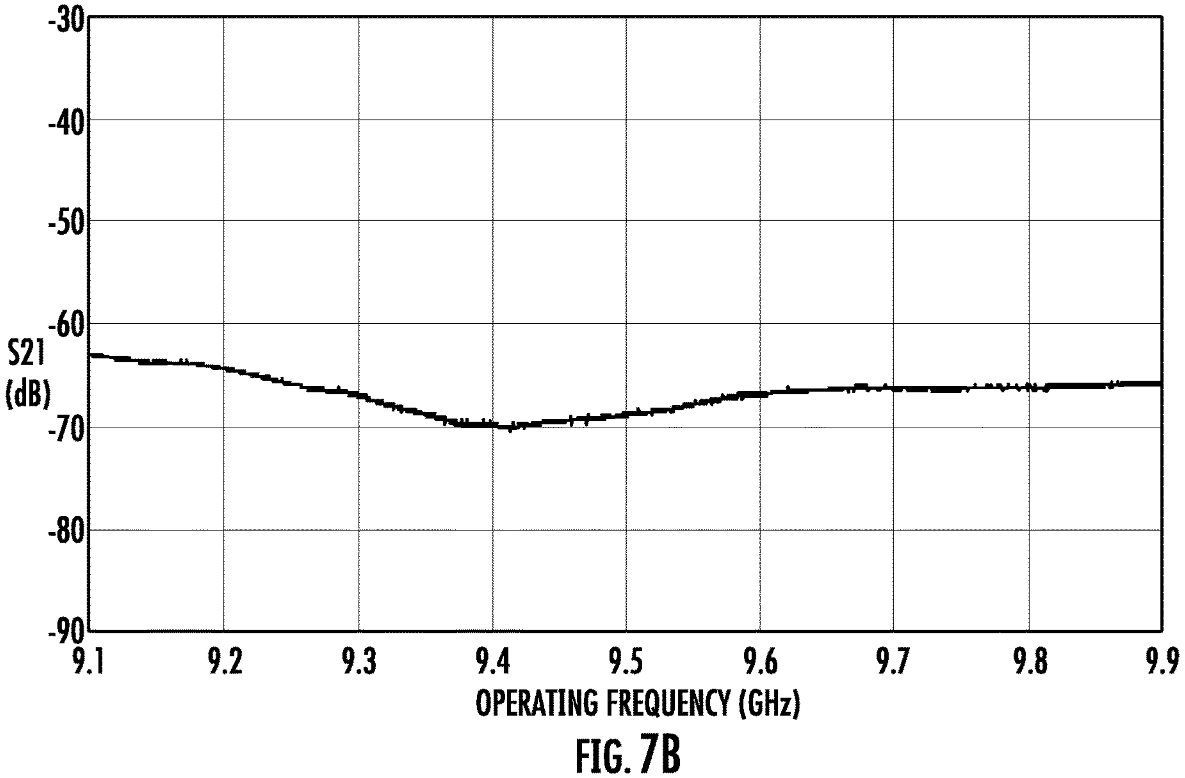

Having thus described the invention in general terms, reference will now be made to the accompanying drawings, which are not necessarily drawn to scale, and wherein:

FIG. 1 illustrates a perspective view of a radar device, in accordance with some embodiments discussed herein;

FIG. 2A illustrates a perspective view of an example single choke waveguide assembly and other features within a housing of a radar device, in accordance with some embodiments discussed herein;

FIG. 2B illustrates a cross-sectional view of the single choke waveguide assembly and other features within a housing of a radar device, in accordance with some embodiments discussed herein;

FIG. 2C illustrates an enhanced, cross-sectional view of the single choke waveguide assembly illustrated in FIG. 2B, in accordance with some embodiments discussed herein;

FIG. 2D illustrates a perspective view of an example first component of a single choke waveguide assembly, in accordance with some embodiments discussed herein;

FIG. 2E illustrates a perspective view of an example second component of a single choke waveguide assembly, in accordance with some embodiments discussed herein;

FIG. 2F illustrates a schematic view of single choke waveguide assembly with an adapter provided for determining a partial transmission coefficient ($S_{21\_PARTIAL}$), in accordance with some embodiments discussed herein;

FIG. 2G illustrates a schematic view of the adapter shown in FIG. 2F that may be used for determining a partial transmission coefficient ($S_{21\_PARTIAL}$), in accordance with some embodiments discussed herein;

FIG. 3A illustrates a perspective view of an example double choke waveguide assembly and other features within a housing of a radar device, in accordance with some embodiments discussed herein;

FIG. 3B illustrates a cross-sectional view of the double choke waveguide assembly and other features within a housing of a radar device, in accordance with some embodiments discussed herein;

FIG. 3C illustrates an enhanced, cross-sectional view of the double choke waveguide assembly shown in FIG. 3B, in accordance with some embodiments discussed herein;

FIG. 3D illustrates a bottom perspective view of a first part having a first component with a first waveguide, in accordance with some embodiments discussed herein;

FIG. 3E illustrates a top perspective view of a second part having a second component with a second waveguide, in accordance with some embodiments discussed herein;

FIG. 3F illustrates a perspective view of an example second component of a double choke waveguide assembly, in accordance with some embodiments discussed herein;

FIG. 4A illustrates a partial-sectional view of another example double choke waveguide assembly, in accordance with some embodiments discussed herein;

FIG. 4B illustrates a perspective view of a first component having a first waveguide, in accordance with some embodiments discussed herein;

FIG. 4C illustrates a partial-sectional view of the first component having a first waveguide and various dimensions for features of the first component, in accordance with some embodiments discussed herein;

FIG. 4D illustrates a perspective view of a second component having a second waveguide, in accordance with some embodiments discussed herein;

FIG. 4E illustrates a sectional view of the second component having a second waveguide and various dimensions for features of the second component, in accordance with some embodiments discussed herein;

FIG. 5A illustrates radio-frequency power leakage occurring where radio-frequency power is transmitted without any choke used, in accordance with some embodiments discussed herein;

FIG. 5B illustrates radio-frequency power leakage occurring where radio-frequency power is transmitted with one choke used, in accordance with some embodiments discussed herein;

FIG. 5C illustrates radio-frequency power leakage occurring where radio-frequency power is transmitted with two chokes used, in accordance with some embodiments discussed herein;

FIG. 6A illustrates the partial transmission coefficient ($S_{21\_PARTIAL}$) for a single choke waveguide assembly with an air gap that is 0.011 of a guide wavelength, in accordance with some embodiments discussed herein;

FIG. 6B illustrates the partial transmission coefficient ($S_{21\_PARTIAL}$) for a single choke waveguide assembly with an air gap that is 0.023 of a guide wavelength, in accordance with some embodiments discussed herein;

FIG. 7A illustrates the partial transmission coefficient ($S_{21\_PARTIAL}$) for a double choke waveguide assembly with an air gap that is 0.011 of a guide wavelength, in accordance with some embodiments discussed herein; and FIG. 7B illustrates the partial transmission coefficient ($S_{21\_PARTIAL}$) for a double choke waveguide assembly with an air gap that is 0.023 of a guide wavelength, in accordance with some embodiments discussed herein.

Figure 8:
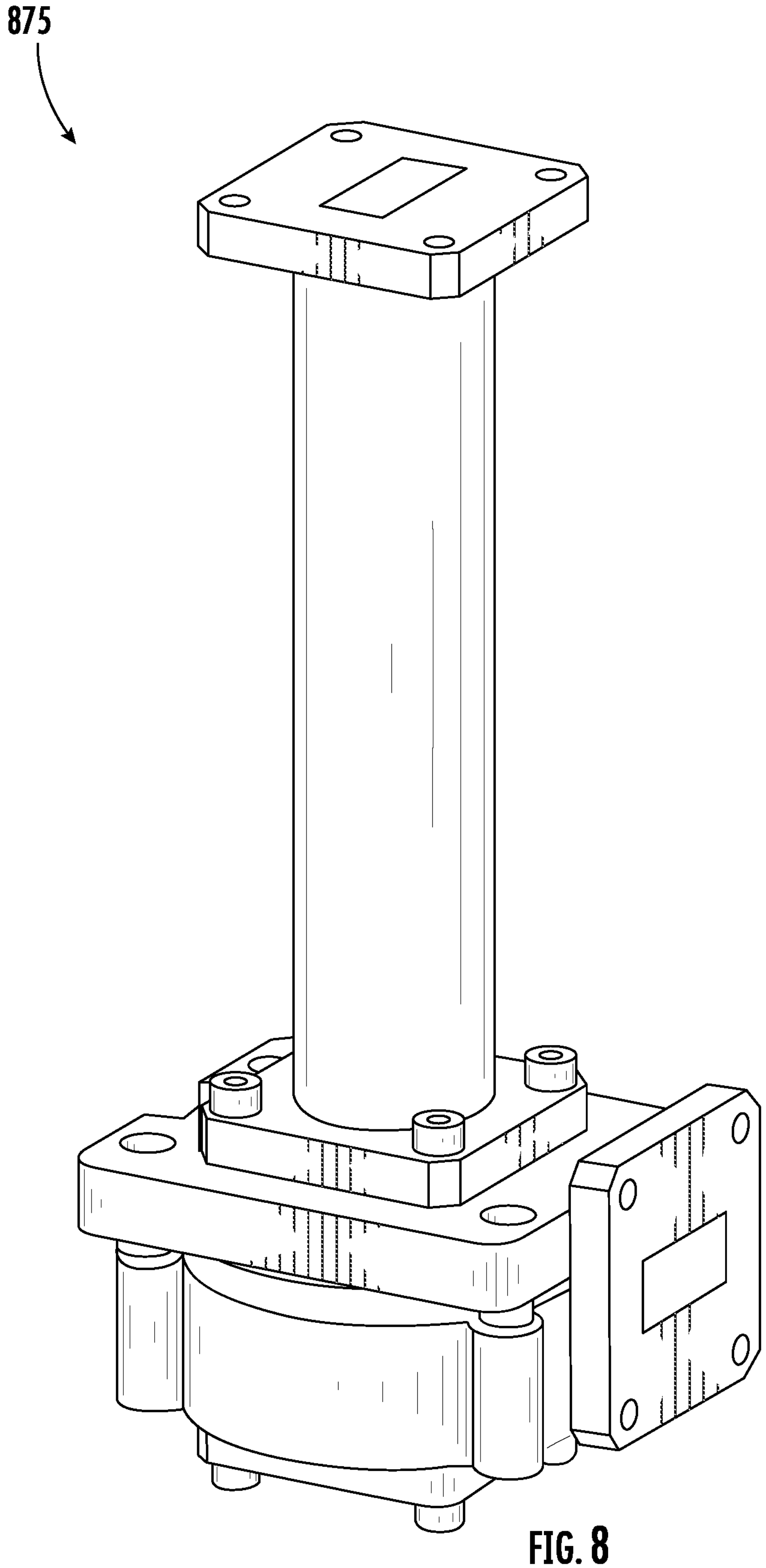

FIG. 8 illustrates a three-dimensional model that may be used to determine a partial transmission coefficient ($S_{21\_PARTIAL}$), in accordance with some embodiments discussed herein.

Figure 9A:
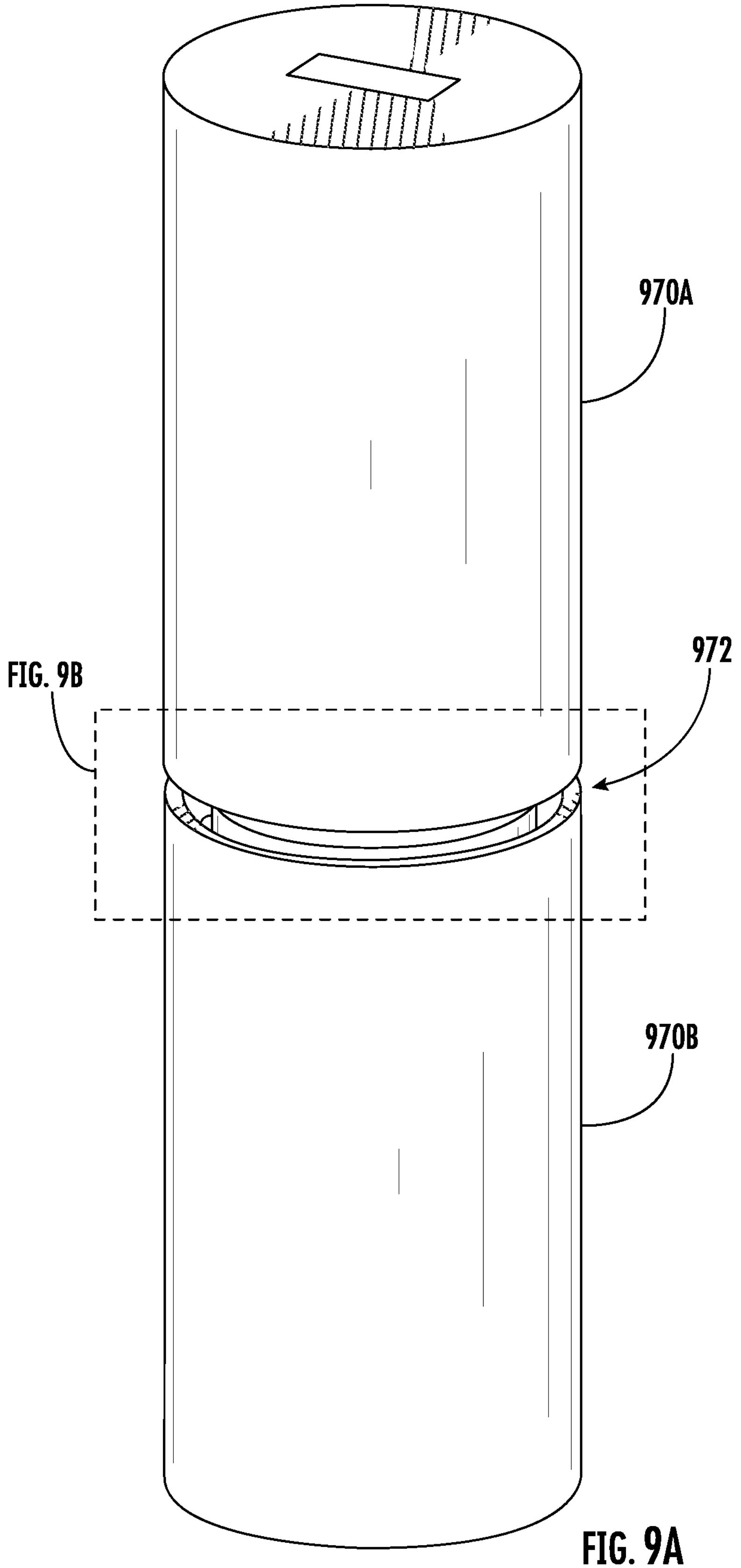

FIG. 9A illustrates a simplified three-dimensional model that may be used to determine a simulated partial transmission coefficient ($S_{21\_PARTIAL}$), in accordance with some embodiments discussed herein.

Figure 9B:
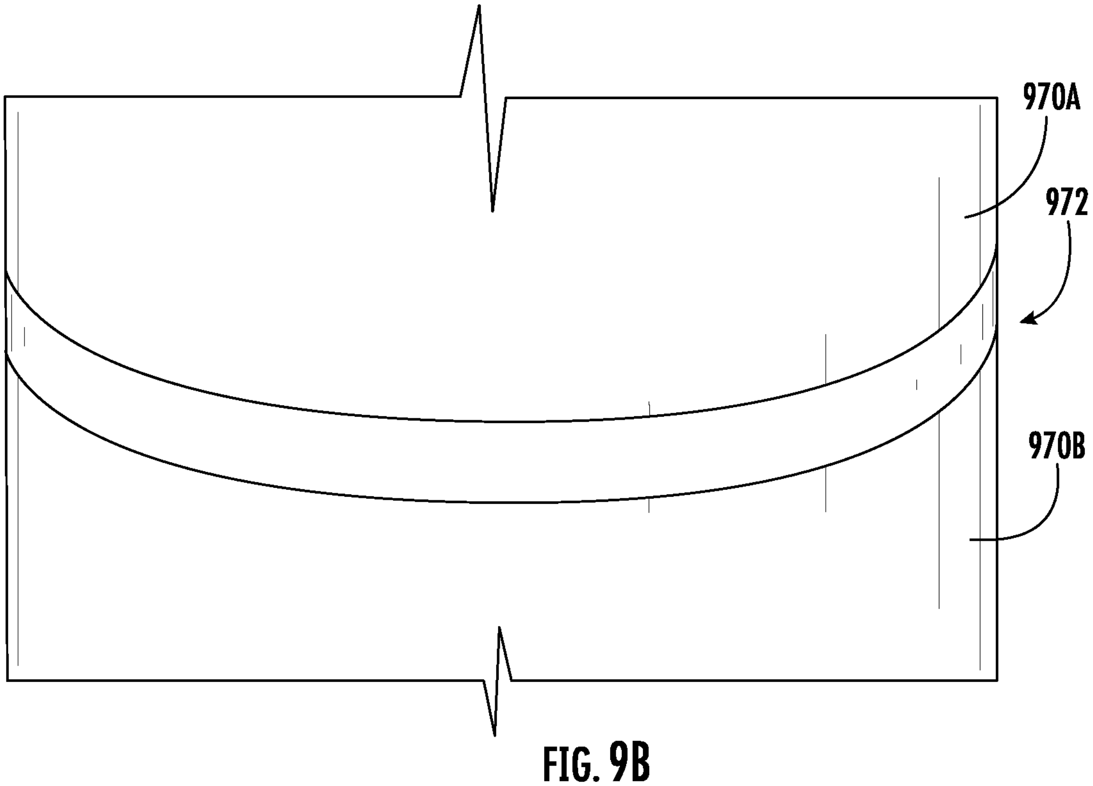

FIG. 9B illustrates an enhanced view of the simplified three-dimensional model of FIG. 9A, in accordance with some embodiments discussed herein.

Figure 10A:
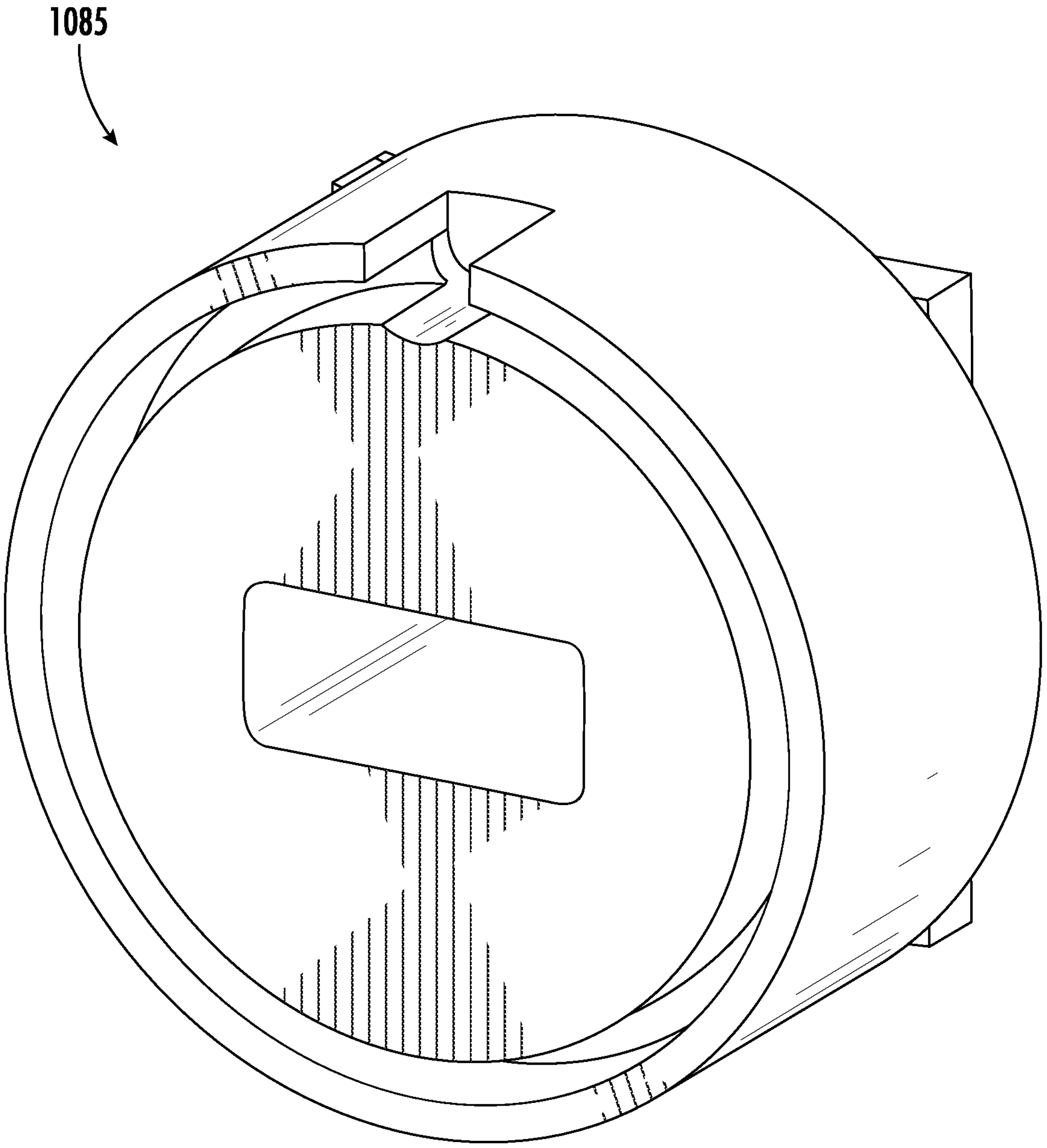

FIG. 10A illustrates a circular shaped component with a circular groove, in accordance with some embodiments discussed herein.

Figure 10B:
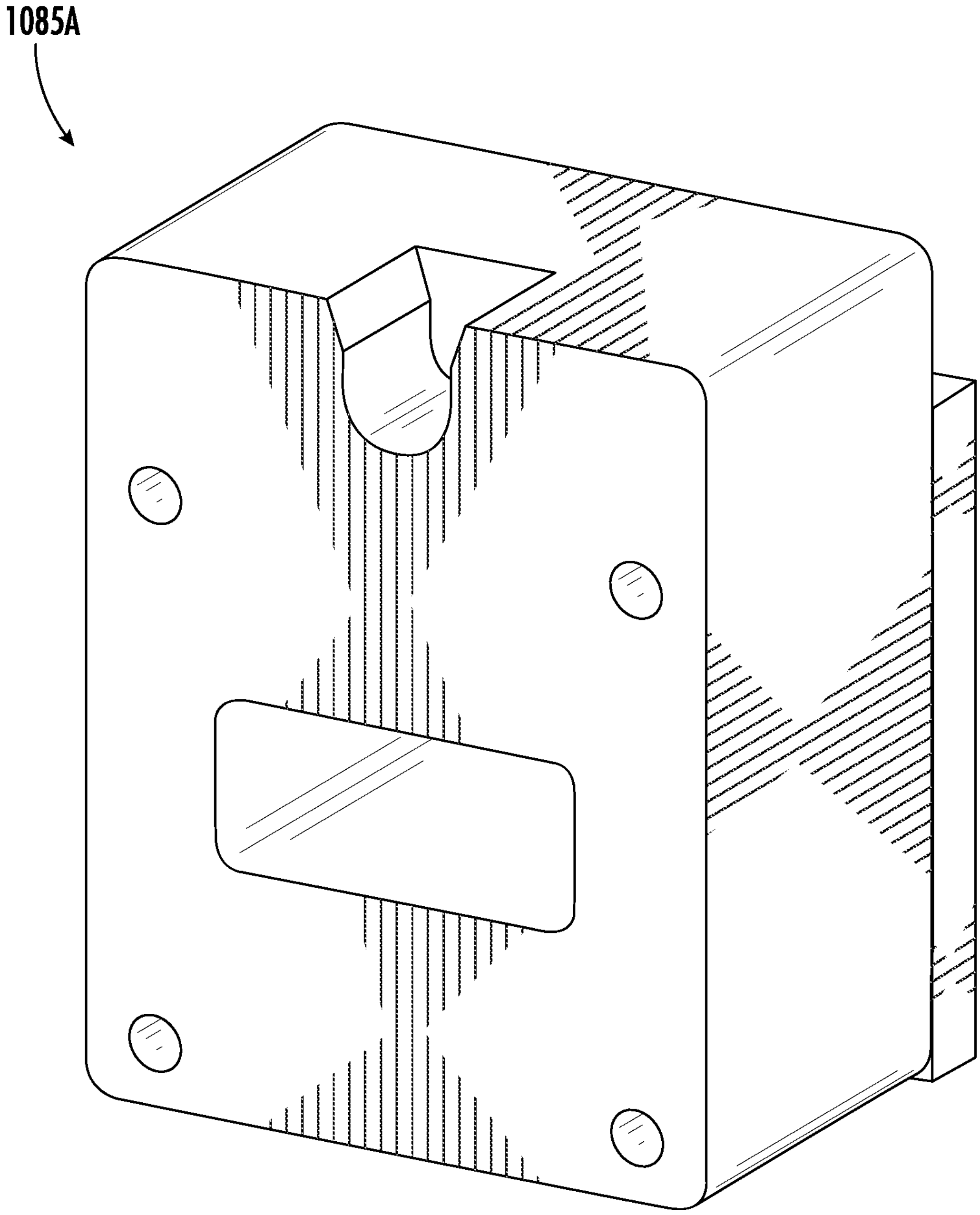

FIG. 10B illustrates a rectangular shaped component, in accordance with some embodiments discussed herein.

Figure 10C:
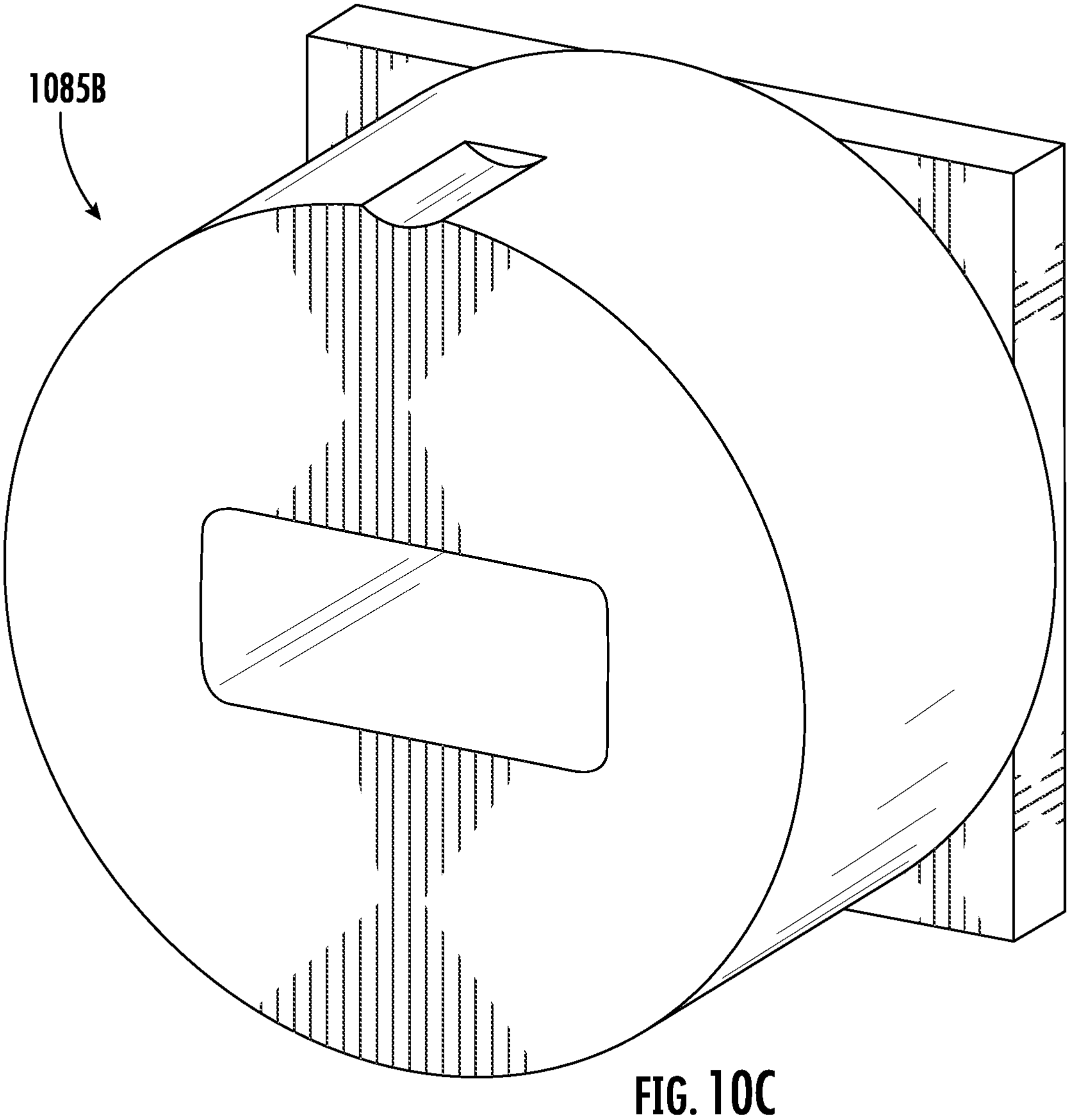

FIG. 10C illustrates a circular shaped component, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals refer to like elements throughout. Additionally, any connections or attachments may be direct or indirect connections or attachments unless specifically noted otherwise.

Various waveguides may be used within the radar device. Table 1 below presents exemplary parameters for various waveguide sizes that may be used. Note that the selected operating frequency ($f_0$) is an arbitrary value selected within the frequency range for each waveguide size and that other operating frequencies may be used. The values provided below are merely exemplary and may vary depending on the operating frequency and other factors.

TABLE 1

| Waveguide Sizes | | | | | | |
|---|---|---|---|---|---|---|
| Waveguide Size | Frequency Range (GHz) | Inside Dimensions (mm) | $f_0$ (GHz) | $\lambda_0$ (mm) | $\lambda_c$ (mm) | $\lambda_g$ (mm) |
| WR-03 | 220-325 | 0.86 × 0.43 | 300 | 2.00 | 1.73 | 1.23 |
| WR-04 | 170-260 | 1.09 × 0.55 | 200 | 1.50 | 2.18 | 2.06 |
| WR-05 | 140-220 | 1.30 × 0.65 | 180 | 1.67 | 2.59 | 2.17 |
| WR-06 | 110-170 | 1.65 × 0.83 | 140 | 2.14 | 3.30 | 2.81 |
| WR-08 | 90-140 | 2.03 × 1.02 | 120 | 2.50 | 4.06 | 3.17 |
| WR-10 | 75-110 | 2.54 × 1.27 | 95 | 3.16 | 5.08 | 4.03 |
| WR-12 | 60-90 | 3.10 × 1.55 | 75 | 4.00 | 6.20 | 5.23 |
| WR-15 | 50-75 | 3.76 × 1.88 | 60 | 5.00 | 7.52 | 6.69 |
| WR-19 | 40-60 | 4.78 × 2.39 | 50 | 6.00 | 9.55 | 7.70 |
| WR-22 | 33-50 | 5.69 × 2.84 | 45 | 6.66 | 11.38 | 8.22 |
| WR-28 | 26.50-40.00 | 7.11 × 3.56 | 35 | 8.57 | 14.22 | 10.73 |
| WR-42 | 18.00-26.50 | 10.67 × 4.32 | 25 | 11.99 | 21.34 | 14.50 |
| WR-62 | 12.40-18.00 | 15.80 × 7.90 | 15 | 19.99 | 31.60 | 25.80 |
| WR-90 | 8.20-12.40 | 22.86 × 10.16 | 9.45 | 31.72 | 45.72 | 44.06 |
| WR-187 | 3.95-5.85 | 47.55 × 22.15 | 4.5 | 66.62 | 95.10 | 93.36 |
| WR-284 | 2.60-3.95 | 72.14 × 34.04 | 3.5 | 85.66 | 144.27 | 106.45 |
| WR-650 | 1.12-1.70 | 165.10 × 82.55 | 1.5 | 199.86 | 330.20 | 251.08 |

The operating wavelength ($\lambda_0$) may be the wavelength in free space, and this operating wavelength may make a total phase difference ($2\pi$) between two consecutive waves. The operating wavelength ($\lambda_0$) may be determined using the following formula, where c is the speed of light in free space:

$$\lambda_0 = \frac{c}{f_0}$$

For example, where a WR90 waveguide is used at an operating frequency ($f_0$) of 9.45 gigahertz, the operating wavelength ($\lambda_0$) may be equal to 1.25 inches or 31.72 mm. In the lowest mode, propagation may occur in a waveguide when the operating wavelength ($\lambda_0$) is between a and 2$a$, where a is the longer dimension of the internal dimensions for the waveguide. Thus, with inside dimensions of 22.86 mm×10.16 mm for a waveguide, a is equal to 22.86 mm.

Additionally, the minimum frequency at which the lowest mode starts propagation is called the cutoff frequency ($f_C$). The cutoff wavelength ($\lambda_C$) may be determined using the following formula:

$$\lambda_C = 2a$$

Using an a value of 22.86 mm, the cutoff wavelength ($\lambda_C$) is 45.72 mm. The cutoff wavelength ($\lambda_C$) may also be determined by dividing the speed of light by the cutoff frequency ($f_C$).

A guide wavelength ($\lambda_g$) may also differ from the operating wavelength ($\lambda_0$) as a wavelength may be longer inside a waveguide than it is in free space. The guide wavelength ($\lambda_g$) may be determined using the following formula:

$$\lambda_g = \frac{\lambda_0}{\sqrt{1 - \left(\frac{\lambda_0}{\lambda_c}\right)^2}}$$

Thus, the guide wavelength ($\lambda_g$) may be 44.06 mm for a WR-90 waveguide operating at a frequency of 9.45. This guide wavelength may be generated where the average input power is 130 W. Various guide wavelengths ($\lambda_g$) are provided above in Table 1 for various waveguide sizes and operating frequencies.

Various dimensions are discussed herein using the guide wavelength ($\lambda_g$) as a unit of measure. It should be understood that the overall size of the waveguide assemblies discussed herein may be scaled up or down. For example, the length of one guide wavelength may be much smaller for a WR-03 waveguide than the length of one guide wavelength for a WR-650 waveguide, so the WR-650 may be approximately 205 times larger than the WR-03 waveguide.

In various embodiments, a radar device may be utilized that limits radio-frequency (RF) power leakage. Additionally, the radar device may provide improved heat dissipation, preventing overheating of features within the radar device. FIG. 1 illustrates a perspective view of an example radar device 100, in accordance with some embodiments discussed herein. The radar device 100 may include a housing 102 and an antenna 104. Various features of the radar device 100 will be described in greater detail in reference to subsequent figures. In some embodiments, this antenna 104 may be configured to rotate relative to other components of the radar device 100. For example, the antenna 104 may be configured to rotate relative to the second component 222 (see FIG. 2C). The antenna 104 may be connected to a rotary joint in the housing 102.

To provide improved heat dissipation and a limited amount of radio-frequency power leakage, a single choke waveguide assembly may be utilized within a radar device. FIG. 2A illustrates a perspective view of an example single choke waveguide assembly 206 and other features within a housing 102 (see FIG. 1) of a radar device 100 (see FIG. 1). Similarly, FIG. 2B illustrates a sectional view of the example single choke waveguide assembly 206 and other features within the housing 202 of a radar device 100 (see FIG. 1). A second part 210 may be disposed within the housing 102 (see FIG. 1) of the radar device 100 (see FIG. 1). Processing circuitry 234 may also be provided. The second part 210 may be disposed between the processing circuitry 234 and the single choke waveguide assembly 206, which includes a first component 212 (see FIG. 2C) and a second component 222 (see FIG. 2C). In this way, the second part 210 may protect the processing circuitry 234 from exposure to radio-frequency power traveling through the first waveguide 216 and the second waveguide 226.

Additionally, the processing circuitry 234 and the waveguides 216, 226 may both generate heat. An air gap 232 is provided that is configured to enhance heat dissipation. This air gap 232 may isolate the first component 212 from the second component 222 to enable separate heat dissipation from each of the first component 212 and the second component 222 to one or more exterior walls of the housing 202. As illustrated in FIG. 2B, heat from the first component 212 may be transferred by conduction, with heat transferring from the first component 212, through the first part 208, and through the first connector(s) 209 to the external walls of the housing 202. By contrast, heat from the second component 222 may be transferred by conduction, with heat transferring from the second component 222, through the second part 210, and through the second connector(s) 211 to the external walls of the housing 202. Additionally, processing circuitry 234 may be provided below the second part 210, and heat from the processing circuitry 234 may be transferred through the second part 210 and the second connector 211 to the external walls of the housing 202. While some heat may also be transferred by convection, the second part 210 may separate heat generated at the waveguide assembly 206 from the heat generated at the processing circuitry 234. By separating the heat dissipation of these features, overheating may be prevented at a specific location.

A first part 208 may also be provided, and this may be connected to the first component 212 of the single choke waveguide assembly 206, as discussed below. While the first part 208 is shown attached to the housing 202 in the illustrated embodiment of FIG. 2B, the first part 208 may be provided as a fixed part of a rotary housing in some embodiments, with the rotary housing being configured to rotate with the antenna 104 (see FIG. 1). The second part 210 may be provided as a metallic case in some embodiments. In some embodiments, the first part 208 and/or the second part 210 may be temporarily laterally displaced (e.g., along the air gap) to increase the ease in maintenance. This is indicated by the arrows at the periphery of FIG. 2A. In some embodiments, a motor may be provided to cause movement of the second part 210 as indicated by the arrows at the periphery of FIG. 2A, and one or more tabs may be provided in the second part 210 to limit movement of the second part 210. After the second part 210 has moved a certain amount along the path indicated by the arrows, the tab(s) may engage another component to prevent further movement of the second part 210. Additionally, maintenance is easier to perform because features of the radar device 100 (see FIG. 1) can be removed without having to detach the two components of the waveguide system (as they are already separated by the air gap).

These features and other features may be seen in greater detail in FIG. 2C. FIG. 2C illustrates an enhanced, sectional view of the single choke waveguide assembly 206 illustrated in FIG. 2B, in accordance with some embodiments discussed herein. As illustrated, the single choke waveguide assembly 206 may include a first component 212 and a second component 222. The first component 212 may be connected to the first part 208, and the second component 222 may be connected to the second part 210. The first component 212 may include a first surface 214, and the first component 212 may also include a first waveguide 216. This first waveguide 216 may define a first cavity 218. The second component 222 may include a second surface 224, and the second component 222 may also include a second waveguide 226. This second waveguide 226 may define a second cavity 228. The first cavity 218 in the first waveguide 216 of the first component 212 may align with the second cavity 228 in the second waveguide 226 of the second component 222 along an axis. The first waveguide 216 and the second waveguide 226 may be configured to facilitate transmission of radio-frequency power within the first cavity 218 and the second cavity 228. In some embodiments, radio-frequency power may be transmitted from the first cavity 218 towards the second cavity 228 at times and may be transmitted in the opposite direction at other times. The single choke waveguide assembly 206, including the first component 212 and the second component 222 of the single choke waveguide assembly 206, may be disposed in the housing 202 (see FIG. 2B). The first waveguide 216 and the second waveguide 226 may be provided as rectangular wave guides ("RWGs") in some embodiments, with the waveguides having a predominantly rectangular shape. However, the first waveguide 216 and the second waveguide 226 may take on other shapes in different embodiments (e.g., circular, square, etc.). Current may flow on the inner surfaces of the waveguides 216, 226 due to a skin effect in some embodiments.

The first component 212 and the second component 222 may be assembled so that an air gap 232 is maintained between the first waveguide 216 and the second waveguide 226. The air gap 232 may extend between the first surface 214 and the second surface 224 in some embodiments. The air gap 232 may assist in enhancing heat dissipation, preventing the single choke waveguide assembly 206 and other features within the radar device (see FIG. 1) from being overheated. For example, by isolating the first component 212 from the second component 222 and creating the air gap 232, separate heat dissipation may be enabled from the first component 212 and the second component 222 to the external housing 202. Thus, heat within the cavities 218, 228 and in the waveguides 216, 226 may be dissipated outwardly (as indicated by the outwardly pointing arrows) towards the external walls of the housing 202. Additionally, the inclusion of an air gap 232 permits wider tolerances, reducing the cost of manufacturing the single choke waveguide assembly 206 and the radar device 100. This air gap 232 may simply be greater than zero $\lambda_g$ in thickness in some embodiments. However, the air gap 232 may have a maximum thickness that is 0.011 of a guide wavelength where only a single groove 220 is used. In some embodiments, the first component 212 may be configured to move relative to the second component 222.

A first groove 220 may also be provided. This first groove 220 may be configured to act as a choke. As radio-frequency power is being transmitted between the first waveguide 216 and the second waveguide 226, some portion of the radio-frequency power may get directed into the air gap 232 and outside of the first cavity 218 and the second cavity 228. As the radio-frequency power moves radially in the air gap 232 away from the first waveguide 216 and the second waveguide 226, the radio-frequency power may get directed into the first groove 220. This first groove 220 may reduce leakage of radio-frequency power into the surrounding environment. This first groove 220 may be defined in the first surface 214 of the first component 212. Alternatively, the first groove 220 may be defined in the second surface 224 of the second component 222.

As radio-frequency power is being transmitted between the first waveguide 216 and the second waveguide 226, a small portion of the radio-frequency power may get directed into the air gap 232. As the radio-frequency power moves radially in the air gap 232 away from the first waveguide 216 and the second waveguide 226, the radio-frequency power may get directed into the first groove 220. As radio-frequency power is directed into the first groove 220, electromagnetic waves may combine constructively and destructively. The first groove 220 has the net effect of reducing the amount of radio-frequency power that leaks through the air-gap 232 and into the surrounding environment. For example, a portion of the electromagnetic waves may extend to the top surface of the first groove 220 and may then reflect back downwardly. These reflected electromagnetic waves may combine destructively with other electromagnetic waves entering the first groove 220, causing the total amount of radio-frequency power leakage to be reduced. Additionally, some portion of the electromagnetic waves may be redirected from the first groove 220 back towards the waveguides 216, 226. Notably, when significant radio-frequency power leakage occurs, the antenna 104 (see FIG. 1) and processing circuitry 234 within the radar device 100 (see FIG. 1) may be adversely impacted. For example, significant radio-frequency power leakage may result in reduced performance in antenna target detection, an increased amount of noise at a receiver, and reduced safety. Thus, reduced radio-frequency power leakage may improve the performance and safety of the radar device and the waveguide assembly.

FIGS. 2D and 2E also illustrate the first component 212 and second component 222 that may be used in embodiments having a single choke waveguide assembly. As illustrated, the first component 212 may have what is largely a rectangular shape, and the first groove 220 may have a circular shape. The first groove 220 may be centered on the first component 212. While the first groove 220 has a circular shape in FIG. 2D, other shapes may be used. For example, the first groove 220 may have an oval shape, a rectilinear shape, or other shapes. Additionally, the second component 222 may largely have a cylindrical shape. However, the first component 212 and the second component 222 may have different shapes in other embodiments.

Various shapes have been evaluated for the first component and the second component, and FIGS. 10A-10C illustrate some of the shapes that were evaluated. As illustrated, the component 1085 illustrated in FIG. 10A has a circular shape and a circular groove, the component 1085A illustrated in FIG. 10B has a rectangular shape without any grooves, and the component 1085B illustrated in FIG. 10C has a circular shape without any grooves. Testing of these components 1085, 1085A, 1085B indicated that the components having circular shapes resulted in lower radio-frequency power leakage than the rectangular shaped component 1085A. Testing also indicated that the component 1085, which had a circular shape and a circular groove, had a lower amount of radio-frequency power leakage than component 1085A and component 1085B.

Various approaches may be taken for determining the amount of radio-frequency leakage. In some embodiments, an additional component having a waveguide may be provided as illustrated in FIG. 2F, and this waveguide may be used to measure radio-frequency power leakage. FIG. 2G illustrates a schematic view of an additional waveguide used for measuring radio-frequency power leakage.

Looking first at FIG. 2F, two components 212, 222 having waveguides 216, 226 may be provided, and these waveguides 216, 226 may be WR90 waveguides. These waveguides 216, 226 may be separated by an air gap 232. An adapter 285 may be provided and may be used to measure the amount of radio-frequency power leakage. The adapter 285 may be a coax-to-WR90 adapter in some embodiments. This adapter 285 may be connected to a Vector Network Analyzer (VNA), and the VNA may have a full two-port calibration type with an X11644A calibration kit. The VNA may also have a port power output of −5 decibel milliwatts. The VNA may be configured to operate at frequencies ranging between 9.00 gigahertz and 10.00 gigahertz at 1601 points. The VNA may operate with a vertical scale of −90.0 decibels to +10.0 decibels and with an average factor of 100.

In some embodiments, the adapter 285 may be placed near the air gap 232 so that the adapter 285 is provided near the source of electromagnetic radiation. In the region close to this source, electric and magnetic fields are not stable and complicated wave combinations may occur, and this may influence partial transmission coefficients ($S_{21\_PARTIAL}$) determined at the adapter. However, the adapter 285 will still be provided close enough to the air gap 232 to exceed the noise floor. By contrast, if the adapter 285 is placed too far away from the air gap 232, then the energy captured in the adapter will be too low, and the adapter 285 will be unable to meaningfully distinguish energy captured from other noise.

The adapter 285 may have a measurement waveguide 280, and this measurement waveguide 280 may be a WR90 waveguide in some embodiments. In some embodiments, the adapter 285 may be configured to change the size of the air gap 232 between the waveguides 216, 226 of the two components 212, 222. The adapter 285 may be used to determine a partial transmission coefficient ($S_{21\_PARTIAL}$) based on the amount of radio-frequency power that is leaked into the adapter 285, and this partial transmission coefficient ($S_{21\_PARTIAL}$) can be used as an indication of the total radio-frequency power leakage. For example, a first port of the VNA may be connected proximate to the waveguide 226 to receive an input indicating the total radio-frequency power moving through the waveguide 226, and a second port of the VNA may be connected to the measurement waveguide 280 at the adapter to receive an input indicating the radio-frequency power moving through the measurement waveguide 280. The VNA may then determine the partial transmission coefficient ($S_{21\_PARTIAL}$) by dividing the input at the second port by the input at the first port. While the measurement waveguide 280 at the adapter 285 captures only a portion of the total radio-frequency power leakage available, the adapter 285 allows the total radio-frequency power leakage to be determined. The adapter 285 is illustrated as being a distance H away from the two components 212, 222. The distance H may be between 4 millimeters and 6 millimeters in some embodiments, and the distance H will be approximately 5 millimeters in some embodiments.

Looking now at FIG. 2G, the adapter 285 and the measurement waveguide 280 therein are shown. The measurement waveguide 280 may measure the electric field vertically polarized (E-Plane) in some embodiments. The arrows depicted in FIG. 2G illustrate the electric field in a transverse electric 10 mode (TE10-mode) in the measurement waveguide 280, and only external electric fields that are vertically aligned with the TE10-mode may be captured in the measurement waveguide 280.

In some embodiments, a double choke waveguide assembly may be provided, and this assembly may have even less radio-frequency power leakage as compared to a single choke waveguide assembly. FIG. 3A illustrates a perspective view of a double choke waveguide assembly 306 and other features within a housing 302 (see FIG. 3B) of a radar device 100 (see FIG. 1). FIG. 3B illustrates a sectional view of a housing 302 and the double choke waveguide assembly 306 of FIG. 3A. Similar to the housing discussed above, the housing 302 illustrated in FIGS. 3A-3B may include a first part 308 and a second part 310.

Further detail regarding the double choke waveguide assembly 306 may be observed in FIG. 3C. FIG. 3C illustrates an enhanced view of the double choke waveguide assembly 306 shown in FIG. 3B. The double choke waveguide assembly 306 may include a first component 312 and a second component 322. The first component 312 may be connected to the first part 308, and the second component 322 may be connected to the second part 310. The first component 312 may include a first surface 314, and the first component 312 may also include a first waveguide 316. This first waveguide 316 may define a first cavity 318. The second component 322 may include a second surface 324, and the second component 322 may also include a second waveguide 326. This second waveguide 326 may define a second cavity 328. The first cavity 318 in the first waveguide 316 of the first component 312 may align with the second cavity 328 in the second waveguide 326 of the second component 322 along an axis. The first waveguide 316 and the second waveguide 326 may be configured to facilitate transmission of radio-frequency power within the first cavity 318 and second cavity 328.

The first component 312 and the second component 322 may be assembled so that an air gap 332 is maintained between the first waveguide 316 and the second waveguide 326. The air gap 332 may extend between the first surface 314 and the second surface 324 in some embodiments. The air gap 332 may assist in enhancing heat dissipation, preventing the double choke waveguide assembly 306 and other features within the radar device 100 (see FIG. 1) from overheating. For example, heat within the cavities 318, 328 and in the waveguides 316, 326 may be dissipated as indicated by the arrows towards the external housing 302. As discussed above in reference to FIG. 2B, heat within the first component 312 may be dissipated separately from the heat within second component 322. Additionally, the inclusion of an air gap 332 permits wider tolerances, reducing the cost of manufacturing the double choke waveguide assembly 306 and the radar device 100 (see FIG. 1). This air gap 332 may simply be thickness that is greater than zero in some embodiments. However, the air gap 332 may have a maximum thickness that is 0.034 of a guide wavelength in embodiments where two grooves 320, 330 are used, and the use of additional grooves may permit an even larger air gap 332. In some embodiments, the first component 312 may be configured to move relative to the second component 322.

As illustrated in FIG. 3C, a second groove 330 may be provided in addition to the first groove 320 (notably, the first groove 320 in FIG. 3C may be similar to (or the same as) the first groove 220 shown in FIG. 2C). This second groove 330 may be similar to the first groove 220, 320. This second groove 330 may further reduce leakage of radio-frequency power through the air gap 332. This second groove 330 may be defined in the first surface 314 of the first component 312. Alternatively, the second groove 330 may be defined in the second surface 324 of the second component 322, as is illustrated in FIG. 3C. Notably, the first groove 320 and the second groove 330 may both be provided in only one of the first component 312 or the second component 322 in some embodiments. By providing a second groove 330, a double choke waveguide assembly may be provided. This double choke waveguide assembly may further reduce the radio-frequency power leakage through the air gap 332.

As radio-frequency power is being transmitted between the first waveguide 316 and the second waveguide 326, a small portion of the radio-frequency power may get directed into the air gap 332 and outside of the first cavity 318 and the second cavity 328. As the radio-frequency power moves radially in the air gap 332 away from the first waveguide 316 and the second waveguide 326, the radio-frequency power may get directed into the first groove 320. As radio-frequency power is directed into the first groove 320, electromagnetic waves may combine constructively and destructively. The first groove 320 has the net effect of reducing the amount of radio-frequency power that leaks through the air-gap 332 and into the surrounding environment. For example, a portion of the electromagnetic waves may extend to the top surface of the first groove 320 and may then reflect back downwardly. These reflected electromagnetic waves may combine destructively with other electromagnetic waves entering the first groove 320, causing the total amount of radio-frequency power leakage to be reduced. Additionally, some portion of the electromagnetic waves may be redirected from the first groove 320 back towards the waveguides 316, 326. If radio-frequency power continues to move radially in the air gap 332 past the first groove 320, then the radio-frequency power may get directed into the second groove 330. This second groove 330 may operate like the first groove 320. As radio-frequency power is directed into the second groove 330, electromagnetic waves may combine constructively and destructively. The second groove 330 has the net effect of reducing the amount of radio-frequency power that leaks through the air-gap 332 and into the surrounding environment. Additionally, some portion of the electromagnetic waves may be redirected from the second groove 3300 back towards the waveguides 316, 326.

The first component 312 and the second component 322 may be provided as integral parts within the first part 308 and the second part 310 respectively in some embodiments. However, in other embodiments, first component 312 and/or the second component 322 may be provided as separate components that are configured to be attached to the first part 308 and the second part 310 in some embodiments.

FIG. 3D illustrates a bottom perspective view of the first part 308. The first part 308 may be connected to the first component 312. This first component 312 may be similar to the first component 212 (see FIG. 2C) discussed above. The first component 312 may include a first waveguide 316 that defines a first cavity 318. Additionally, the first component 312 may define a first surface 314, and a first groove 320 may be defined in this first surface 314 that may serve as a choke.

FIG. 3E illustrates a top perspective view of a second part 310. The second part 310 may include a second component 322. The second component 322 may include a second waveguide 326 that defines a second cavity 328. Additionally, the first component 322 may define a second surface 324, and a second groove 330 may be defined in this second surface 324 that may serve as a choke.

FIG. 3F illustrates a second component 322 that may be used in embodiments having a double choke waveguide assembly. In some embodiments, this second component 322 may be used alongside the first component 212 illustrated in FIG. 2D to form a double choke waveguide assembly. As illustrated in FIG. 3F, the second component 322 may include a second groove 330 that has a circular shape. The second groove 330 may be centered on the second component 322 in some embodiments. While the second groove 330 has a circular shape in FIG. 3F, other shapes may be used. For example, the second groove 330 may have an oval shape, a rectilinear shape, or other shapes. Additionally, the second component 322 may generally have a cylindrical shape. However, the second component 322 may have different shapes in other embodiments.

FIG. 4A illustrates a partial-sectional view of another double choke waveguide assembly 406, in accordance with some embodiments discussed herein. Similar to the double choke waveguide assembly 306 (see FIG. 3C) discussed above, the double choke waveguide assembly 406 may include a first component 412 and a second component 422. The first component 412 may include a first surface 414, and the first component 412 may also include a first waveguide 416. This first waveguide 416 may define a first cavity 418. The second component 422 may include a second surface 424, and the second component 422 may also include a second waveguide 426. This second waveguide 426 may define a second cavity 428. The first cavity 418 in the first waveguide 416 of the first component 412 may align with the second cavity 428 in the second waveguide 426 of the second component 422 along an axis. The first waveguide 416 and the second waveguide 426 may be configured to facilitate transmission of radio-frequency power within the first cavity 418 and second cavity 428.

The first component 412 and the second component 422 may be assembled so that an air gap 432 is maintained between the first waveguide 416 and the second waveguide 426. The air gap 432 may be similar to the air gap 332 discussed above in reference to FIGS. 3A-3E. Additionally, a first groove 420 and a second groove 430 may also be provided, and the first groove 420 and the second groove 430 may both be configured to act as a choke. The grooves 420, 430 may be similar to the grooves 320, 330 discussed above in reference to FIGS. 3A-3E.

FIG. 4B illustrates a perspective view of a first component 412. This illustrates the features of the first component 412 from a different perspective, including the first surface 414, the first waveguide 416, the first cavity 418, and the first groove 420. FIG. 4C illustrates a partial-sectional view of the first component 412 illustrated in FIG. 4B, and various dimensions of the first groove 420 are illustrated. The first groove 420 may have a width A. In some embodiments, the width A of the first groove 420 may range from 0.057 of a guide wavelength to 0.061 of a guide wavelength. In the illustrated embodiment, the width A of the first groove 420 is 0.059 of a guide wavelength. It should be noted that a person of ordinary skill in the art would recognize that all measurements stated herein are subject to tolerances and that some deviation from the stated measurements would be acceptable.

The first groove 420 may have an inner diameter B, which may be measured at the inner wall 421 of the first groove 420. In the illustrated embodiment, inner diameter B is 0.608 of a guide wavelength (an example range for the inner diameter B is 0.606 of a guide wavelength to 0.611 of a guide wavelength). The first groove 420 may be centered on the central axis 423A of the first component 412. The first groove 420 may also have a depth C. In the illustrated embodiment, this depth C is 0.148 of a guide wavelength (an example range for the depth C is 0.145 of a guide wavelength to 0.150 of a guide wavelength). Also, the first component 412 may have a perimeter wall 425 with an outer diameter I. The outer diameter I of the first component 412 may be 1.317 of a guide wavelength in some embodiments (an example range for the outer diameter is 1.310 of a guide wavelength to 1.323 of a guide wavelength).

FIG. 4D illustrates a perspective view of a second component 422. This illustrates the features of the second component 422 from a different perspective, including the second surface 424, the second waveguide 426, the second cavity 428, and the second groove 430. FIG. 4E illustrates a sectional view of the second component 422 illustrated in FIG. 4D, and various dimensions of the second component 422 and the second groove 430 are illustrated. The second component 422 may have an exterior wall 429 with an outer diameter D taking a wide variety of values. In the illustrated embodiment, this outer diameter D is 1.317 of a guide wavelength (an example range for the outer diameter D is 1.310 of a guide wavelength to 1.323 of a guide wavelength). Additionally, the second groove 430 may have an inside wall 427 with an inner diameter E, and this inner diameter E is 1.021 of a guide wavelength in the illustrated embodiment (an example range for the inner diameter E is 1.019 of a guide wavelength to 1.024 of a guide wavelength). The inner diameter E may be measured from the inside wall 427 on one side of the second groove 430 to the inside wall 427 on an opposite side of the second groove 430. The second groove 430 may have a width F. This width F may be 0.089 of a guide wavelength in some embodiments (an example range for the width F is 0.086 of a guide wavelength to 0.091 of a guide wavelength). The second groove 430 may have a depth G taking a wide variety of values, and this depth G is 0.179 of a guide wavelength in the illustrated embodiment (an example range for the depth G is 0.178 of a guide wavelength to 0.180 of a guide wavelength). In some embodiments, the depth G of the second groove 430 may be greater than the depth C of the first groove 420. A greater depth in the second groove that is located further away from the waveguides than the first groove may aid in reducing the amount of leaked radio-frequency power.

The first component 412 and the second component 422 may both be generally symmetrical about a central axis, but certain features on the first component 412 and the second component 422 may not be symmetrical such as the first waveguide 416 and the second waveguide 426 and the first cavity 418 and the second cavity 428. Features such as the first groove 420 and the second groove 430 may be circular grooves that are symmetrical about a central axis of the first component 412 and the second component 422. In some embodiments, the first groove 420 may define an inner edge. The first groove 420 may be provided on the first component 412 or the second component 422.

Through the use of a single choke waveguide assembly or a double choke waveguide assembly, the amount of radio-frequency power leakage through an air gap can be significantly decreased. FIGS. 5A-5C illustrate the effectiveness of these chokes in reducing radio-frequency power leakage. FIG. 5A illustrates radio-frequency power leakage occurring where radio-frequency power is transmitted without any choke used in an example waveguide assembly. FIG. 5B illustrates radio-frequency power leakage occurring where radio-frequency power is transmitted with one choke used in a single choke waveguide assembly. FIG. 5C illustrates radio-frequency power leakage occurring where radio-frequency power is transmitted with two chokes used in a double choke waveguide assembly. In the illustrated examples, the radio-frequency power is transmitted upwardly from the second waveguide 326 (see FIG. 3C) to the first waveguide 316 (see FIG. 3C) and ultimately to the antenna 104 (see FIG. 1).

In FIG. 5A, the radio-frequency power leakage through the air gap is significant, and a substantial amount of radio-frequency power is leaked to the surrounding environment. As illustrated, a significant portion of the illustrated leakage map includes high intensity areas 550 and a lesser number of moderate intensity areas 552. With the introduction of a choke in FIG. 5B, the radio-frequency power leakage through the air gap is reduced substantially, with the total transmission coefficient ($S_{21\_TOTAL}$) being −35 decibels or lower (more negative). As illustrated in FIG. 5B, the high intensity areas 550 are generally limited to the volume within the waveguide assembly. Some moderate intensity areas 552 exist outside of the waveguide assembly, but a significant number of low intensity areas 554 also exist outside of the waveguide assembly.

The radio-frequency power leakage through the air gap is reduced even further where a double choke waveguide assembly is used as illustrated in FIG. 5C. The total transmission coefficient ($S_{21\_TOTAL}$) may be −70 decibels or lower (more negative) where a double choke waveguide assembly is used. Where the double choke is used, high intensity areas 550 and moderate intensity areas 552 are generally limited to the volume within the waveguide assembly, and the volume outside of the waveguide assembly only includes low intensity areas 554. Additional chokes may also be implemented to further reduce the radio-frequency power leakage. The radio-frequency power leakage values stated above may be obtained when utilizing an operating frequency of 9.5 gigahertz or lower, but other operating frequencies may also be used.

FIGS. 6A-6B and 7A-7B illustrate partial transmission coefficients (521 PARTIAL) that occur with a single choke waveguide assembly and with a double-choke waveguide assembly. These results were obtained by using a testing setup similar to the one illustrated in FIGS. 2F-2G and discussed above. FIG. 6A illustrates the partial transmission coefficient (521 PARTIAL) for a single choke waveguide assembly where an air gap that is 0.011 of a guide wavelength was used. FIG. 6B illustrates the partial transmission coefficient (521 PARTIAL) for a single choke waveguide assembly where an air gap that is 0.023 of a guide wavelength was used. FIG. 7A illustrates the partial transmission coefficient ($S_{21\_PARTIAL}$) for a double choke waveguide assembly where an air gap that is 0.011 of a guide wavelength was used. FIG. 7B illustrates the partial transmission coefficient ($S_{21\_PARTIAL}$) for a double choke waveguide assembly where an air gap that is 0.023 of a guide wavelength was used. A summary of the data illustrated in FIGS. 6A-6B and 7A-7B is illustrated in Table 2 below.

TABLE 2

Measured Partial Transmission Coefficient ($S_{21\_PARTIAL}$) Data using Adapter

| Air Gap Width ($\lambda_g$) | Operating Frequency (Gigahertz) | Partial Transmission Coefficient ($S_{21\_PARTIAL}$) with Single Choke (decibels) | Partial Transmission Coefficient ($S_{21\_PARTIAL}$) with Double Choke (decibels) |
|---|---|---|---|
| 0.000 | 9.40 | −78.4 | −80.5 |
| 0.000 | 9.45 | −77.3 | −85.8 |
| 0.000 | 9.50 | −75.1 | −82.7 |
| 0.011 | 9.40 | −49.3 | −74.2 |
| 0.011 | 9.45 | −49.5 | −72.5 |
| 0.011 | 9.50 | −50.0 | −71.4 |
| 0.023 | 9.40 | −40.0 | −69.6 |
| 0.023 | 9.45 | −40.3 | −69.3 |
| 0.023 | 9.50 | −40.7 | −68.8 |
| 0.034 | 9.40 | −34.9 | −65.6 |
| 0.034 | 9.45 | −35.3 | −66.2 |
| 0.034 | 9.50 | −35.6 | −67.0 |
| 0.045 | 9.40 | −32.7 | −59.2 |
| 0.045 | 9.45 | −33.0 | −59.3 |
| 0.045 | 9.50 | −33.4 | −59.7 |
| 0.057 | 9.40 | −30.1 | −56.2 |
| 0.057 | 9.45 | −30.4 | −56.9 |
| 0.057 | 9.50 | −30.8 | −57.8 |
| 0.068 | 9.40 | −28.3 | −55.6 |
| 0.068 | 9.45 | −28.6 | −57.2 |
| 0.068 | 9.50 | −29.0 | −59.1 |
| 0.079 | 9.40 | −27.1 | −59.4 |
| 0.079 | 9.45 | −27.5 | −64.1 |
| 0.079 | 9.50 | −27.9 | −71.6 |
| 0.091 | 9.40 | −25.4 | −65.6 |
| 0.091 | 9.45 | −25.8 | −58.4 |
| 0.091 | 9.50 | −26.2 | −54.5 |
| 0.102 | 9.40 | −25.0 | −51.1 |
| 0.102 | 9.45 | −25.3 | −48.3 |
| 0.102 | 9.50 | −25.8 | −46.5 |
| 0.113 | 9.40 | −24.0 | −43.7 |
| 0.113 | 9.45 | −24.3 | −42.2 |
| 0.113 | 9.50 | −24.7 | −41.0 |

As illustrated in FIG. 6A, the partial transmission coefficient ($S_{21\_PARTIAL}$), measured in decibels, is shown on the vertical axis and the operating frequency, measured in gigahertz, is illustrated on the horizontal axis. The waveguide assemblies may commonly operate in the operating band of 9.40 gigahertz to 9.50 gigahertz, and this operating band is illustrated in FIG. 6A. As illustrated, with an air gap that is 0.011 of a guide wavelength and a single choke waveguide assembly, the partial transmission coefficient ($S_{21\_PARTIAL}$) is −49.3 decibels at 9.40 gigahertz, −49.5 decibels at 9.45 gigahertz, and −50.0 decibels at 9.50 gigahertz.

FIG. 6B illustrates the partial transmission coefficient ($S_{21\_PARTIAL}$) for a single choke waveguide assembly where the air gap is 0.023 of a guide wavelength. As illustrated, the partial transmission coefficient ($S_{21\_PARTIAL}$) is −40.0 decibels at 9.40 gigahertz, −40.3 decibels at 9.45 gigahertz, and −40.7 decibels at 9.50 gigahertz. Thus, the increase in the thickness of the air gap (from an air gap that is 0.011 of a guide wavelength to an air gap that is 0.023 of a guide wavelength) may improve heat dissipation, but it also results in higher transmission coefficients (and therefore higher levels of radio-frequency power leakage).

FIG. 7A illustrates the partial transmission coefficient ($S_{21\_PARTIAL}$) for a double choke waveguide assembly where the air gap is 0.011 of a guide wavelength. As illustrated, the partial transmission coefficient ($S_{21\_PARTIAL}$) is −74.2 decibels at 9.40 gigahertz, −72.5 decibels at 9.45 gigahertz, and −71.4 decibels at 9.50 gigahertz. Thus, the use of a double choke waveguide assembly may reduce the partial transmission coefficient ($S_{21\_PARTIAL}$) and also reduce the radio-frequency power leakage even more than the single choke waveguide assembly, and the double choke waveguide assembly may do so without negatively impacting the heat dissipation of the waveguide assembly. The use of a double choke waveguide assembly instead of a single choke waveguide assembly may result in an increase of the partial transmission coefficient ($S_{21\_PARTIAL}$) by 30 decibels or more where the air gap is 0.011 of a guide wavelength.

FIG. 7B illustrates the partial transmission coefficient ($S_{21\_PARTIAL}$) for a double choke waveguide assembly where the air gap is 0.023 of a guide wavelength. As illustrated, the partial transmission coefficient ($S_{21\_PARTIAL}$) is −69.6 decibels at 9.40 gigahertz, −69.3 decibels at 9.45 gigahertz, and −68.8 decibels at 9.50 gigahertz. Thus, the increase in the thickness of the air gap (from an air gap that is 0.011 of a guide wavelength to an air gap that is 0.023 of a guide wavelength) may improve heat dissipation, but it also results in higher transmission coefficients (and therefore higher levels of radio-frequency power leakage).

Additionally, to confirm the accuracy of measured testing results using the adapter 285 (see FIG. 2F), multiple simulation tests have been performed. FIG. 8 illustrates a three-dimensional model 875 that was used to determine a simulated radio-frequency power leakage value. The three-dimensional model 875 used to determine a simulated radio-frequency power leakage value emulated the measured setup illustrated in FIG. 2F. Table 3 presents simulated partial transmission coefficients ($S_{21\_PARTIAL}$) that were obtained using the three-dimensional model 875.

TABLE 3

Simulated Partial Transmission Coefficient ($S_{21\_PARTIAL}$) Data using Three-Dimensional Model

| Air Gap Width ($\lambda_g$) | Operating Frequency (Gigahertz) | Partial Transmission Coefficient ($S_{21\_PARTIAL}$) with Single Choke (decibels) | Partial Transmission Coefficient ($S_{21\_PARTIAL}$) with Double Choke (decibels) |
|---|---|---|---|
| 0.000 | 9.40 | −91.3 | −150.7 |
| 0.000 | 9.45 | −91.6 | −151.0 |
| 0.000 | 9.50 | −92.0 | −151.3 |
| 0.011 | 9.40 | −50.9 | −80.6 |
| 0.011 | 9.45 | −51.6 | −80.1 |
| 0.011 | 9.50 | −52.1 | −80.3 |
| 0.023 | 9.40 | −41.5 | −68.0 |
| 0.023 | 9.45 | −42.0 | −67.6 |
| 0.023 | 9.50 | −42.5 | −67.4 |
| 0.034 | 9.40 | −36.4 | −61.0 |
| 0.034 | 9.45 | −36.9 | −61.1 |
| 0.034 | 9.50 | −37.4 | −61.2 |
| 0.045 | 9.40 | −33.0 | −57.0 |
| 0.045 | 9.45 | −33.5 | −57.5 |
| 0.045 | 9.50 | −33.9 | −58.0 |
| 0.057 | 9.40 | −30.5 | −55.5 |
| 0.057 | 9.45 | −31.0 | −56.5 |
| 0.057 | 9.50 | −31.4 | −57.6 |
| 0.068 | 9.40 | −28.5 | −57.3 |
| 0.068 | 9.45 | −29.0 | −59.6 |
| 0.068 | 9.50 | −29.4 | −62.5 |
| 0.079 | 9.40 | −27.0 | −62.2 |
| 0.079 | 9.45 | −27.4 | −68.0 |
| 0.079 | 9.50 | −27.9 | −66.8 |
| 0.091 | 9.40 | −25.7 | −61.0 |
| 0.091 | 9.45 | −25.7 | −61.0 |
| 0.091 | 9.50 | −26.1 | −56.1 |
| 0.102 | 9.40 | −26.6 | −53.1 |
| 0.102 | 9.45 | −24.6 | −49.6 |
| 0.102 | 9.50 | −25.1 | −47.4 |
| 0.113 | 9.40 | −23.7 | −43.5 |
| 0.113 | 9.45 | −24.1 | −42.0 |
| 0.113 | 9.50 | −24.6 | −40.9 |

As can be seen by comparing the data from Table 2 and Table 3, the determined partial transmission coefficients ($S_{21\_PARTIAL}$) in the measured setup of Table 2 and the simulated results of Table 3 are largely similar. This illustrates that the measured setup is effective in indicating the partial transmission coefficient ($S_{21\_PARTIAL}$) and the amount of radio-frequency power leakage.

Additionally, simulation tests have also been performed using a simplified three-dimensional model to further validate the results obtained by the measured testing setup of FIG. 2F. FIG. 9A illustrates a simplified three-dimensional model that may be used to determine a total transmission coefficient ($S_{21\_TOTAL}$). FIG. 9B illustrates an enhanced view of the simplified three-dimensional model of FIG. 9A. Using a total transmission coefficient ($S_{21\_TOTAL}$) determined by use of the simplified three-dimensional model, the total radio-frequency power leakage may be determined. As illustrated, a first component 970A having a waveguide and a second component 970B having a waveguide may be provided. In a single choke assembly, only one groove will be provided. In a double choke assembly, two grooves will be provided with one groove in the first component 970A and the other groove in the second component 970B. An air gap 972 may be provided between the waveguides of the first component 970A and the second component 970B. Table 4 illustrates total transmission coefficients ($S_{21\_TOTAL}$) that may be obtained using a simplified three-dimensional model similar to the one depicted in FIG. 9A.

TABLE 4

Simulated Total Transmission Coefficient ($S_{21\_PARTIAL}$) Data with Simplified Three-Dimensional Model

| Air Gap Width ($\lambda_g$) | Operating Frequency (Gigahertz) | Total Transmission Coefficient ($S_{21\_TOTAL}$) with Single Choke | Total Transmission Coefficient ($S_{21\_TOTAL}$) with Double Choke |
|---|---|---|---|
| 0.000 | 9.40 | −98.3 | −141.3 |
| 0.000 | 9.45 | −98.2 | −141.4 |
| 0.000 | 9.50 | −98.0 | −140.4 |
| 0.011 | 9.40 | −37.4 | −70.6 |
| 0.011 | 9.45 | −37.3 | −70.9 |
| 0.011 | 9.50 | −37.0 | −71.1 |
| 0.023 | 9.40 | −27.7 | −58.6 |
| 0.023 | 9.45 | −27.4 | −59.1 |
| 0.023 | 9.50 | −27.2 | −59.6 |
| 0.034 | 9.40 | −21.9 | −51.7 |
| 0.034 | 9.45 | −21.7 | −52.3 |
| 0.034 | 9.50 | −21.5 | −52.9 |
| 0.045 | 9.40 | −17.9 | −47.5 |
| 0.045 | 9.45 | −17.7 | −48.3 |
| 0.045 | 9.50 | −17.5 | −49.1 |
| 0.057 | 9.40 | −15.4 | −45.1 |
| 0.057 | 9.45 | −15.2 | −46.0 |
| 0.057 | 9.50 | −15.1 | −47.0 |
| 0.068 | 9.40 | −13.4 | −41.6 |
| 0.068 | 9.45 | −13.3 | −42.6 |
| 0.068 | 9.50 | −13.2 | −43.3 |
| 0.079 | 9.40 | −11.7 | −38.4 |
| 0.079 | 9.45 | −11.6 | −39.2 |
| 0.079 | 9.50 | −11.5 | −39.6 |
| 0.091 | 9.40 | −10.7 | −34.6 |
| 0.091 | 9.45 | −10.6 | −35.2 |
| 0.091 | 9.50 | −10.5 | −35.6 |
| 0.102 | 9.40 | −9.7 | −31.2 |
| 0.102 | 9.45 | −9.7 | −31.7 |
| 0.102 | 9.50 | −9.6 | −32.0 |
| 0.113 | 9.40 | −8.9 | −28.2 |
| 0.113 | 9.45 | −8.9 | −28.7 |
| 0.113 | 9.50 | −8.9 | −28.9 |

Where a partial transmission coefficient is obtained using a measured approach, a total transmission coefficient may be approximated using the values in Table 2 and Table 4 that correspond to the appropriate air gap size. Additionally, where a simplified three-dimensional model is used, the total radio frequency leakage may be obtained using the total transmission coefficient ($S_{21\_TOTAL}$). This total radio frequency power leakage may resemble a value determined by the following formula:

$$RF\ \text{Leakage} = 10\log_{10}\frac{P_{out}}{P_{in}}$$

In this formula, $P_{out}$ may be the output power that moves through the surface area formed by spacing between waveguides, and $P_{in}$ may be the total amount of input power that is introduced into the waveguides.

The simplified three-dimensional model may be used to determine the total transmission coefficient ($S_{21\_TOTAL}$) and the amount of radio-frequency power leakage occurring through the entire surface area of the air gap. Consequently, the radio-frequency power leakage values for the simplified three-dimensional model may be greater than those obtained through other approaches. Additionally, depending on the operating frequency, certain resonances may occur from a measured setup with an adapter 285 that may impact the calculated radio-frequency power leakage. These resonances may also impact the calculated radio-frequency power leakage values obtained where the three-dimensional model 875 of FIG. 8 is used.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A system for limiting radio-frequency power leakage, the system comprising: a first component having a first surface and a first waveguide that defines a first cavity; a second component having a second surface and a second waveguide that defines a second cavity; and a first groove that is configured to act as a choke, wherein the first component and the second component are assembled so that an air gap is maintained between the first waveguide and the second waveguide, wherein the first waveguide and the second waveguide are configured to facilitate transmission of radio-frequency power, wherein the first groove is configured to reduce leakage of radio-frequency power through the air gap by (1) redirecting radio-frequency power from the first groove back towards the first waveguide and the second waveguide, or (ii) combining electromagnetic waves of the radio-frequency power destructively in the first groove, and wherein the first groove is defined in the first surface or the second surface.

2. The system of claim 1, further comprising a second groove, wherein the second groove is defined in one of the first surface or the second surface.

3. The system of claim 1, further comprising a housing, wherein the first component and the second component are disposed in the housing.

4. The system of claim 1, wherein the first cavity and the second cavity are aligned along an axis.

5. The system of claim 1, wherein the first component is configured to move relative to the second component.

6. The system of claim 1, wherein thickness of the air gap is greater than zero.

7. The system of claim 6, wherein the air gap has a maximum thickness that is 0.034 of a guide wavelength.

8. The system of claim 1, wherein the total transmission coefficient is −30 decibels or more negative.

9. The system of claim 8, wherein the total transmission coefficient is −50 decibels or more negative.

10. The system of claim 9, wherein the total transmission coefficient is −50 decibels or more negative at an operating frequency of 9.5 gigahertz or lower, wherein the total transmission coefficient is determined by obtaining a partial transmission coefficient using an adapter having a measurement waveguide and a Vector Network Analyzer, wherein radio frequency-power is configured to move from the first waveguide towards the second waveguide, wherein a first port of the Vector Network Analyzer is provided at the first waveguide to provide an indication of the radio frequency-power at the first waveguide, wherein the first port is configured to provide a first input, wherein a second port of the Vector Network Analyzer is provided at the measurement waveguide of the adapter, wherein the second port is configured to provide a second input, wherein the partial transmission coefficient is calculated based on the first input and the second input, and wherein the total transmission coefficient is determined using the partial transmission coefficient.

11. The system of claim 1, wherein the first groove has a width that is between 0.057 of a guide wavelength and 0.061 of a guide wavelength.

12. The system of claim 1, wherein the first groove defines an inner diameter that is between 0.606 of a guide wavelength and 0.611 of a guide wavelength.

13. The system of claim 12, further comprising a second groove, wherein the second groove is defined in one of the first surface or the second surface, wherein the second groove defines an inside diameter that is between 1.019 of a guide wavelength and 1.024 of a guide wavelength.

14. A radar device for limiting radio-frequency power leakage, the radar device comprising:

a first component having a first surface and a first waveguide that defines a first cavity;

a second component having a second surface and a second waveguide that defines a second cavity; and a first groove that is configured to act as a choke, wherein the first component and the second component are assembled so that an air gap is maintained between the first waveguide and the second waveguide, wherein the first waveguide and the second waveguide are configured to facilitate transmission of radio-frequency power, wherein the first groove is configured to reduce leakage of radio-frequency power through the air gap, and wherein the first groove is defined in the first surface or the second surface, wherein the air gap is configured to enhance heat dissipation by isolating the first component from the second component to enable separate heat dissipation from each of the first component and the second component to one or more external walls.

15. The radar device of claim 14, wherein the first surface and the second surface are configured to form the air gap extending between the first surface and the second surface.

16. The radar device of claim 14, further comprising a second groove that is defined in the first surface or the second surface.

17. The radar device of claim 14, further comprising an antenna, wherein the antenna is configured to rotate relative to the second component of the radar device.

18. A waveguide assembly for limiting radio-frequency power leakage and increasing heat dissipation comprising:

a first component having a first surface and a first waveguide that defines a first cavity;

a second component having a second surface and a second waveguide that defines a second cavity; and a first groove that is configured to act as a choke, wherein the first component and the second component are assembled so that an air gap is maintained between the first waveguide and the second waveguide, wherein the first waveguide and the second waveguide are configured to facilitate transmission of radio-frequency power, wherein the first groove is configured to reduce leakage of radio-frequency power through the air gap, and wherein the first groove is defined in the first surface or the second surface, wherein the total transmission coefficient is −30 decibels or more negative.

19. The waveguide assembly of claim 18, wherein the total transmission coefficient is −50 decibels or more negative at an operating frequency of 9.5 gigahertz or lower, wherein the total transmission coefficient is determined by obtaining a partial transmission coefficient using an adapter having a measurement waveguide and a Vector Network Analyzer, wherein radio frequency-power is configured to move from the first waveguide towards the second waveguide, wherein a first port of the Vector Network Analyzer is provided at the first waveguide to provide an indication of the radio frequency-power at the first waveguide, wherein the first port is configured to provide a first input, wherein a second port of the Vector Network Analyzer is provided at the measurement waveguide of the adapter, wherein the second port is configured to provide a second input, wherein the partial transmission coefficient is calculated based on the first input and the second input, and wherein the total transmission coefficient is determined using the partial transmission coefficient.

20. The waveguide assembly of claim 18, wherein the first groove is configured to reduce leakage of radio-frequency power through the air gap by (i) redirecting radio-frequency power from the first groove back towards the first waveguide and the second waveguide; or (ii) combining electromagnetic waves of the radio-frequency power destructively in the first groove.

* * * * *